(12) United States Patent
Ueno

(10) Patent No.: US 11,866,142 B2
(45) Date of Patent: Jan. 9, 2024

(54) HULL CONTROL DEVICE, HULL CONTROLLING METHOD, AND HULL CONTROL PROGRAM

(71) Applicant: FURUNO ELECTRIC CO., LTD., Nishinomiya (JP)

(72) Inventor: Hideki Ueno, Takarazuka (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 522 days.

(21) Appl. No.: 17/018,521

(22) Filed: Sep. 11, 2020

(65) Prior Publication Data
US 2021/0078690 A1 Mar. 18, 2021

(30) Foreign Application Priority Data
Sep. 13, 2019 (JP) .................. 2019-166740

(51) Int. Cl.
*B63H 25/04* (2006.01)
*B63H 21/21* (2006.01)

(52) U.S. Cl.
CPC ............. *B63H 25/04* (2013.01); *B63H 21/21* (2013.01); *B63H 2025/045* (2013.01)

(58) Field of Classification Search
CPC .. B63H 25/04; B63H 21/21; B63H 2025/045; G05D 1/0208
See application file for complete search history.

(56) References Cited

U.S. PATENT DOCUMENTS

| | | | |
|---|---|---|---|
| 5,268,844 A | 12/1993 | Carver et al. | |
| 8,340,847 B2 | 12/2012 | Sako et al. | |
| 8,943,988 B1 | 2/2015 | Guglielmo et al. | |
| 9,377,780 B1 | 6/2016 | Arbuckle et al. | |
| 9,718,527 B2 | 8/2017 | Ito | |
| 9,950,777 B2 | 4/2018 | Kishimoto et al. | |
| 10,167,798 B1 | 1/2019 | Van Camp et al. | |
| 10,723,431 B1 | 7/2020 | Przybyl et al. | |
| 11,188,080 B2 | 11/2021 | Akuzawa et al. | |

(Continued)

FOREIGN PATENT DOCUMENTS

| | | |
|---|---|---|
| CN | 109116838 A | 1/2019 |
| EP | 2 246 765 A1 | 11/2010 |

(Continued)

OTHER PUBLICATIONS

Das et al., "Diesel Engine Control and Protection Monitoring using PID Controller", 2019 Innovations in Power and Advanced Computing Technologies (i-PACT), Mar. 22-23, 2019, pp. 1-6, IEEE.

(Continued)

*Primary Examiner* — Harry Y Oh
(74) *Attorney, Agent, or Firm* — Studebaker & Brackett PC

(57) ABSTRACT

A hull control device is provided, which includes an error distance calculating module, an approaching speed calculating module and a command value setting module. The error distance calculating module calculates an error distance between a target position of a fixed-point hold and a ship position. The approaching speed calculating module calculates an approaching speed of a ship to the target position. The command value setting module sets a throttle command value according to a combination of the error distance and the approaching speed.

16 Claims, 18 Drawing Sheets

(56) References Cited

U.S. PATENT DOCUMENTS

| | | |
|---|---|---|
| 2004/0181322 A1 | 9/2004 | Okuyama |
| 2004/0242091 A1 | 12/2004 | Okuyama et al. |
| 2007/0134092 A1 | 6/2007 | Rosenkranz et al. |
| 2007/0293103 A1 | 12/2007 | Kinoshita et al. |
| 2009/0105962 A1 | 4/2009 | Woolf et al. |
| 2009/0288585 A1* | 11/2009 | Mitsui ............... B63B 15/00 114/61.27 |
| 2010/0121505 A1 | 5/2010 | Yamazaki et al. |
| 2012/0010766 A1 | 1/2012 | Sako et al. |
| 2015/0089427 A1 | 3/2015 | Akuzawa |
| 2016/0229511 A1 | 8/2016 | Kishimoto et al. |
| 2016/0280351 A1 | 9/2016 | Ito |
| 2017/0137103 A1 | 5/2017 | Ito |
| 2017/0277189 A1 | 9/2017 | Johnson et al. |
| 2017/0285645 A1 | 10/2017 | Nakagawa |
| 2017/0349258 A1* | 12/2017 | Kishimoto ............ B63B 79/15 |
| 2017/0365175 A1 | 12/2017 | Harnett |
| 2018/0015994 A1 | 1/2018 | Kishimoto et al. |
| 2018/0334234 A1 | 11/2018 | Namba et al. |
| 2019/0039708 A1 | 2/2019 | Hayes et al. |
| 2019/0084662 A1* | 3/2019 | Wong ................ G05D 1/0208 |
| 2019/0249906 A1* | 8/2019 | Wu ..................... G05D 1/0094 |
| 2019/0263483 A1* | 8/2019 | Li ......................... B63B 27/16 |
| 2020/0407034 A1 | 12/2020 | Ueno |
| 2021/0078690 A1 | 3/2021 | Ueno |

FOREIGN PATENT DOCUMENTS

| | | | |
|---|---|---|---|
| EP | 3173324 A1 | 5/2017 | |
| EP | 3 214 523 A1 | 9/2017 | |
| JP | S58-099198 U | 7/1983 | |
| JP | H08-198185 A | 8/1996 | |
| JP | H10-109693 A | 4/1998 | |
| JP | 2004-034805 A | 2/2004 | |
| JP | 2004-142537 A | 5/2004 | |
| JP | 2004-142538 A | 5/2004 | |
| JP | 2007-022422 A | 2/2007 | |
| JP | 2008-155764 A | 7/2008 | |
| JP | 2009-025860 A | 2/2009 | |
| JP | 2011-235839 A | 11/2011 | |
| JP | 2013-151241 A | 8/2013 | |
| JP | 2014-024421 A | 2/2014 | |
| JP | 2015-066979 A | 4/2015 | |
| JP | 2016-144971 A | 8/2016 | |
| JP | 2017088111 A * | 5/2017 | |
| JP | 2017-178242 A | 10/2017 | |
| JP | 2018-192976 A | 12/2018 | |
| JP | 6513677 B2 * | 5/2019 | ............ B63B 49/00 |
| KR | 10-2014-0080106 A | 6/2014 | |
| KR | 10-2018-0044087 A | 5/2018 | |
| WO | 2016/104030 A1 | 6/2016 | |
| WO | 2016/104031 A1 | 6/2016 | |
| WO | 2016/109832 A2 | 7/2016 | |
| WO | 2018/100748 A1 | 6/2018 | |
| WO | 2018/228670 A1 | 12/2018 | |

OTHER PUBLICATIONS

Petratos et al., "A novel robust MPC based aircraft auto-throttle for performing 4D contract flights", 2013 9th Asian Control Conference (ASCC), Jun. 23-26, 2013, pp. 1-6, IEEE.

Schöley et al., "Application of a modified error governor to electronic throttle control", 2017 22nd International Conference on Methods and Models in Automation and Robotics (MMAR), Aug. 28-31, 2017, pp. 815-819, IEEE.

Lee et al., "Assessment of Energy Savings With Variable Speed Drives in Ship's Cooling Pumps", IEEE Transactions on Energy Conversion, vol. 30, No. 4, Jun. 1, 2015, pp. 1288-1298, IEEE.

Haifeng et al., "The Speed Control of Marine Main Engine", 2014 Sixth International Conference on Measuring Technology and Mechatronics Automation, Jan. 10-11, 2014, pp. 770-773, IEEE.

Jiang et al., "An Integrated Control Simulation System of Ship Motion and Main Propulsion", 2014 IEEE International Conference on Information and Automation (ICIA), Jul. 28-30, 2014, pp. 865-869, IEEE.

Oh et al., "System Identification of a Model Ship Using a Mechatronic System", IEEE/ASME Transactions on Mechatronics, vol. 15, No. 2, Jun. 16, 2009, pp. 316-320, IEEE.

Micheau et al., "Engine speed limiter for watercrafts", IEEE Transactions on Control Systems Technology, vol. 14, No. 3, Apr. 24, 2006, pp. 579-585, IEEE.

An Office Action mailed by the United States Patent and Trademark Office dated Oct. 17, 2022, which corresponds to U.S. Appl. No. 17/015,801, and is related to the present application.

Communication pursuant to Article 94(3) EPC issued by the European Patent Office dated Dec. 23, 2021, which corresponds to European Patent Application No. 20 195 841.0-1202 and is related to U.S. Appl. No. 17/018,521.

The extended European search report issued by the European Patent Office dated Nov. 30, 2020, which corresponds to European Patent Application No. 20181370.6-1015 and is related to U.S. Appl. No. 17/018,521.

The extended European search report issued by the European Patent Office dated Dec. 10, 2020, which corresponds to European Patent Application No. 20182258.2-1015 and is related to U.S. Appl. No. 17/018,521.

The extended European search report issued by the European Patent Office dated Feb. 26, 2021, which corresponds to European Patent Application No. 20195840.2-1015 and is related to U.S. Appl. No. 17/018,521.

An Office Action mailed by the United States Patent and Trademark Office dated Jan. 17, 2023, which corresponds to U.S. Appl. No. 16/909,906 and is related to the present application.

The extended European search report issued by the European Patent Office dated Dec. 17, 2020, which corresponds to European Patent Application No. 20195841.0-1202 and is related to U.S. Appl. No. 17/018,521.

An Office Action mailed by the United States Patent and Trademark Office dated Jan. 31, 2023, which corresponds to U.S. Appl. No. 17/015,801, and is related to the present application.

An Office Action mailed by the United States Patent and Trademark Office dated Mar. 16, 2023, which corresponds to U.S. Appl. No. 16/909,978, and is related to the present application.

Communication pursuant to Article 94(3) EPC issued by the European Patent Office dated Sep. 14, 2023, which corresponds to European Patent Application No. 20181370.6-1009 and is related to the present application.

\* cited by examiner

| e / −Δe | N | ZE | PS | PM | PB |
|---|---|---|---|---|---|
| Pd | Ns(ZEs) | ZEs | PSs | PMs | PBs |
| ZEd | Ns(ZEs) | ZEs | PSb | PMb | PBb |
| Nd | Ns(ZEs) | ZEs | PMs | PBs | PBBs |

PS<PM<PB
PSs<PSb, PMs<PMb, PBs<PBb<PBBs

| -ΔeR \ eR | N(R) | ZE(R) | PS(R) | PM(R) | PB(R) |
|---|---|---|---|---|---|
| Pdr | ZEs | ZEs | PSsr | PMsr | PBsr |
| ZEdr | ZEs | ZEs | PSbr | PMbr | PBbr |
| Ndr | ZEs | ZEs | PMsr | PBsr | PBBsr |

Shift=R

| $-\Delta eF$ \ $eF$ | N(F) | ZE(F) | PS(F) | PM(F) | PB(F) |
|---|---|---|---|---|---|
| Pdf | ZEs | ZEs | ZEs | ZEs | PBsf |
| ZEdf | ZEs | ZEs | ZEs | ZEs | PBbf |
| Ndf | ZEs | ZEs | ZEs | ZEs | PBBsf |

Shift=F

HULL CONTROL DEVICE, HULL CONTROLLING METHOD, AND HULL CONTROL PROGRAM

CROSS-REFERENCE TO RELATED APPLICATION(S)

This application claims priority under 35 U.S.C. § 119 to Japanese Patent Application No. 2019-166740, which was filed on Sep. 13, 2019, the entire disclosure of which is hereby incorporated by reference.

TECHNICAL FIELD

The present disclosure relates to an art for maintaining a location of a hull at a substantially fixed point.

BACKGROUND

JP2013-151241A discloses a control device for a hull, which maintains a state where a hull is oriented in a certain direction.

However, the conventional control device disclosed in JP2013-151241A requires a large-scale system in order to maintain the hull at a fixed point.

SUMMARY

Therefore, one purpose of the present disclosure is to provide an art for maintaining a hull at a substantially fixed point, without using a large-scale system.

A hull control device according to one aspect of the present disclosure includes an error distance calculating module, an approaching speed calculating module and a command value setting module. The error distance calculating module calculates an error distance between a target position of a fixed-point hold and a ship position. The approaching speed calculating module calculates an approaching speed of a ship to the target position. The command value setting module sets a throttle command value according to a combination of the error distance and the approaching speed. An AP controller according to one aspect of the present disclosure includes processing circuitry. The processing circuitry calculates an error distance between a target position of a fixed-point hold and a ship position, calculates an approaching speed of a ship to the target position, and sets a throttle command value according to a combination of the error distance and the approaching speed.

In this configuration, the throttle command value is set according to a positional relationship between the target position and the ship, and whether the ship approaches or separates from the target position. That is, according to this configuration, a hull control can be achieved finely according to the behavior of the ship to the target position.

According to the present disclosure, a hull can be maintained at a substantially fixed point, without using a large-scale system.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

First Embodiment

Figure 1:
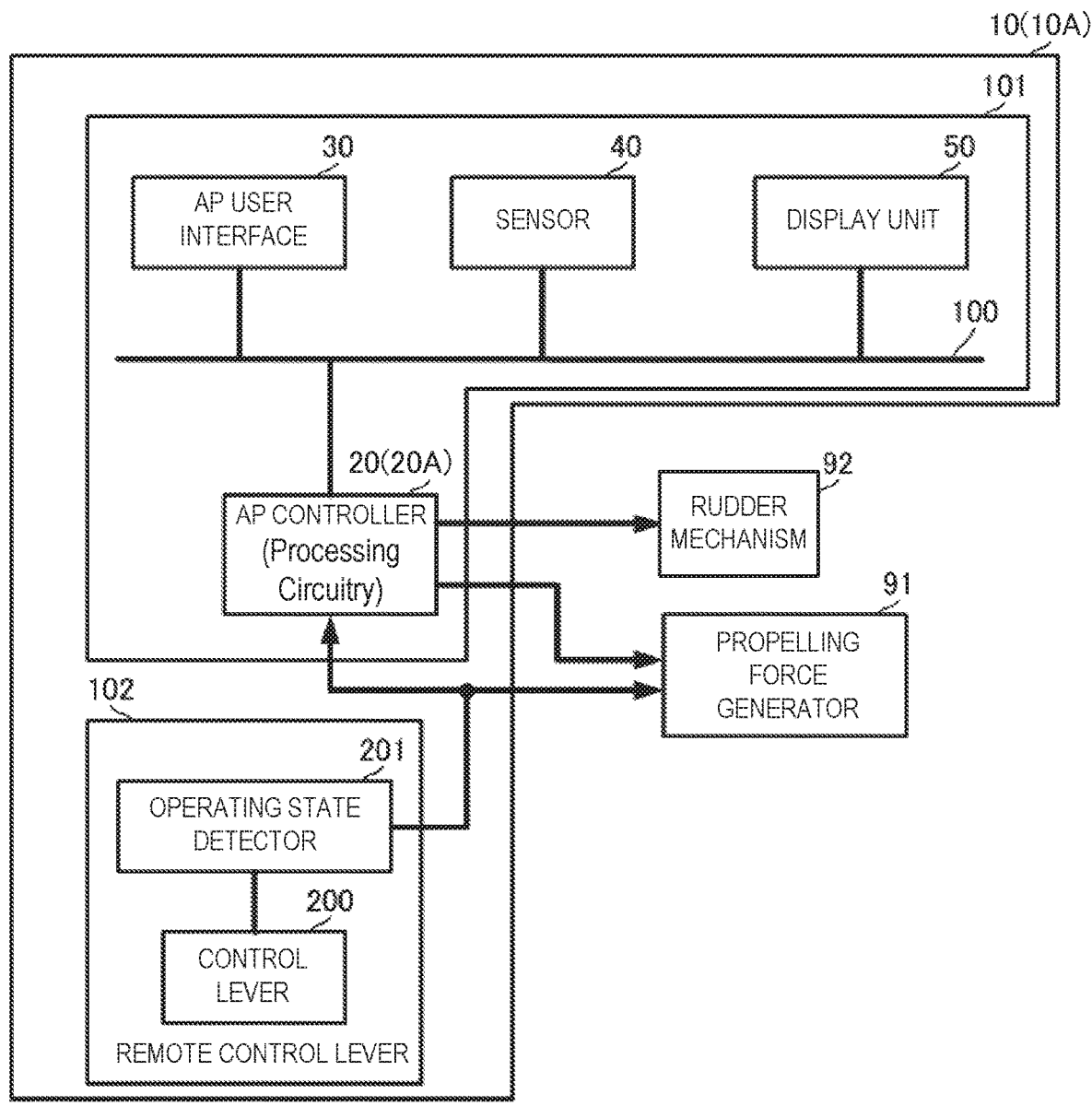
FIG. 1 is a functional block diagram illustrating a configuration of a hull control system including a hull control device according to one embodiment of the present disclosure.
Figure 2:
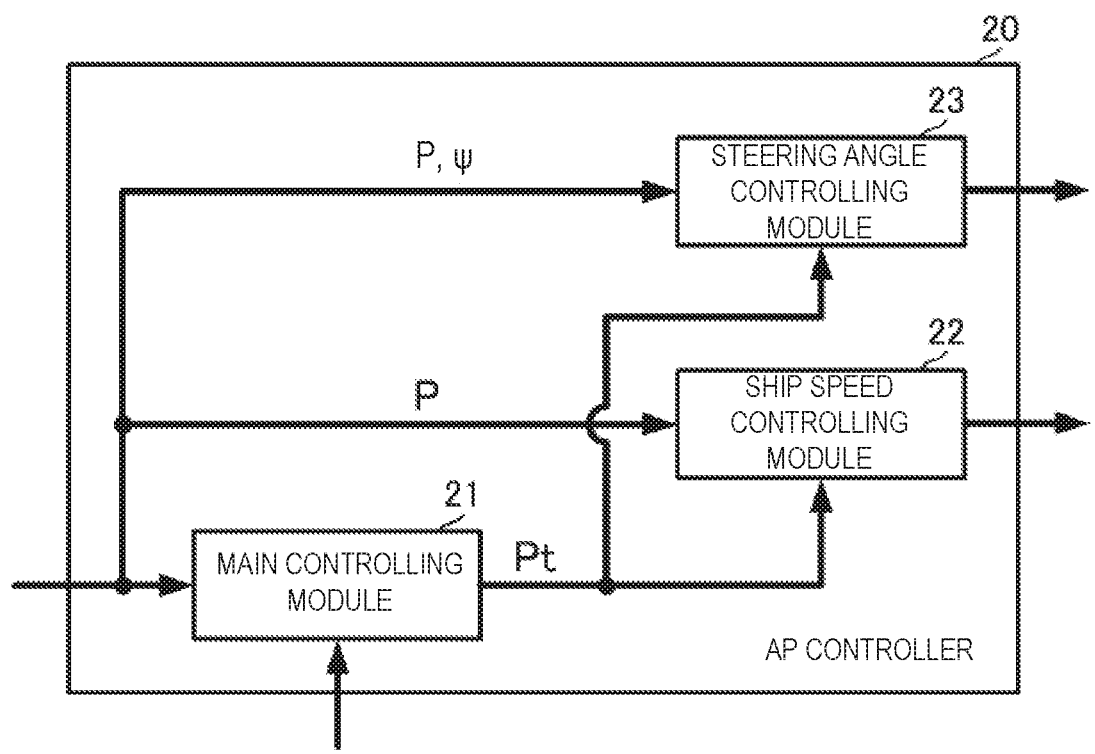
FIG. 2 is a functional block diagram illustrating a configuration of an autopilot controller (AP controller) according to a first embodiment.

A hull control device, a hull controlling method, and a hull control program according to a first embodiment of the present disclosure are described with reference to the accompanying drawings. FIG. 1 is a functional block diagram illustrating a configuration of a hull control system including the hull control device according to the first embodiment. FIG. 2 is a functional block diagram illustrating a configuration of an autopilot controller (AP controller) according to the first embodiment.

(Configuration of Hull Control Device 10)

As illustrated in FIG. 1, a hull control device 10 may include a device body 101 and a remote control lever 102. The device body 101 and the remote control lever 102 may be mounted on a hull 90 of a ship which performs an autopilot control (automatic navigation control). Note that the present disclosure may be applied to ships which typically travel on water or sea which are referred to as surface ships, and may also be applied to other types of ships including boats, dinghies, watercrafts, and vessels. The hull control device 10 may be connected to a propelling force generator 91 and a rudder mechanism 92. Note that the propelling force generator 91 and the rudder mechanism 92 may be provided to various kinds of propelling devices, such as an outboard motor, an inboard motor, and an inboard-outdrive motor. Moreover, one propelling force generator 91 and one rudder mechanism 92 may be provided to the hull. That is, the ship provided with the hull control device 10 of this embodiment is a so-called "1-shaft 1-rudder" ship.

(Configuration of Device Body 101)

The device body 101 may include an AP controller (processing circuitry) 20, an AP user interface 30, a sensor 40, and a display unit 50.

The AP controller 20, the AP user interface 30, the sensor 40, and the display unit 50 may be connected with each other, for example, through a ship data communication network 100. The AP controller 20, the remote control lever 102, and the propelling force generator 91 may be connected with each other, for example, through a propelling force communication network (e.g., CAN). The AP controller 20 and the rudder mechanism 92 may be connected with each other through analog voltage or data communication.

The AP controller 20 may be comprised of, for example, a processor such as a CPU, and a memory. The memory may store a program which is executed by the AP controller 20. Moreover, the memory may be utilized during calculation by the CPU. As illustrated in FIG. 2, the AP controller 20 may include a main controlling module 21, a ship speed controlling module 22, and a steering angle controlling module 23.

Roughly, the main controlling module 21 may perform a main control of the autopilot control (automatic navigation control) for a ship speed and a steering angle which is executed by the AP controller 20. Moreover, for example, the main controlling module 21 may receive a setting of a fixed-point control of the autopilot control from the AP user interface 30. The main controlling module 21 may analyze the setting content, and then control processing timings etc. of the ship speed controlling module 22 and the steering angle controlling module 23 to achieve the fixed-point control. Moreover, the main controlling module 21 may monitor an operating state of a control lever 200 from an operating state detector 201 of the remote control lever 102. The main controlling module 21 may take the monitored results into consideration, and reflect the results to the autopilot control.

The main controlling module 21 may give a target position Pt of the fixed-point control specified by the AP user interface 30 to the ship speed controlling module 22 and the steering angle controlling module 23.

Figure 3A:
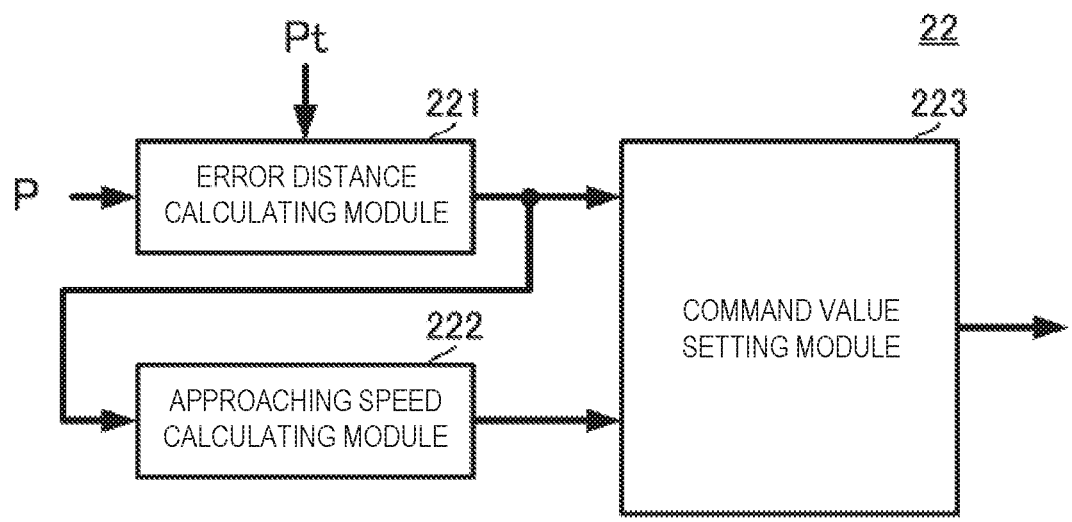
FIG. 3A is a functional block diagram illustrating a configuration of a ship speed controlling module.
Figure 3B:
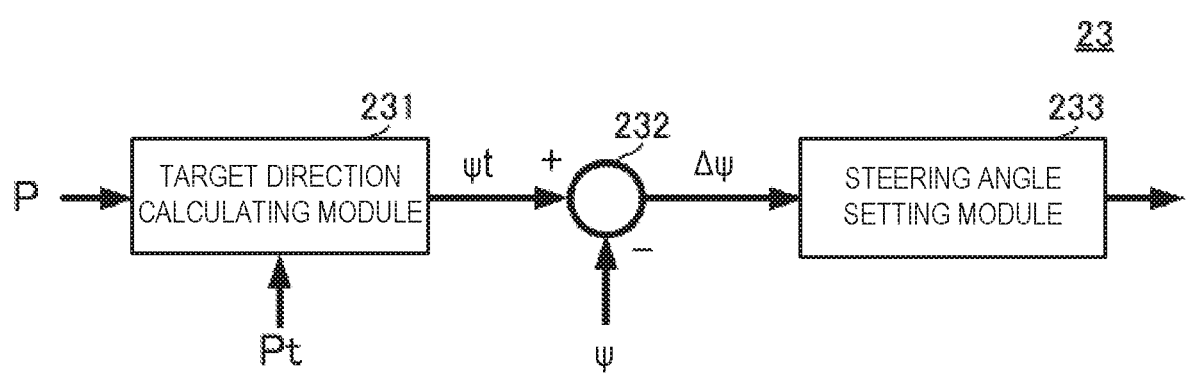
FIG. 3B is a functional block diagram illustrating a configuration of a steering angle controlling module.

FIG. 3A is a functional block diagram illustrating a configuration of the ship speed controlling module, and FIG. 3B is a functional block diagram illustrating a configuration of the steering angle controlling module. As illustrated in FIG. 3A, the ship speed controlling module 22 may include an error distance calculating module 221, an approaching speed calculating module 222, and a command value setting module 223.

The error distance calculating module 221 may calculate an error distance "e" between the target position Pt and a ship position P. Here, the error distance calculating module 221 may set the error distance "e" so that the error distance e becomes 0 at a control start position P0 on a circle CRt centering on the target position Pt (described later), the error distance e becomes a negative value on the target position Pt side with respect to the control start position P0, and the error distance e becomes a positive value on the opposite side of the target position Pt with respect to the control start position P0.

The approaching speed calculating module 222 may calculate a negated or sign-changed value of a derivative of the error distance e, as an approaching speed $-\Delta e$. The approaching speed $-\Delta e$ may be set so that a direction approaching the target position Pt is a positive direction (+ direction) and a direction separating from the target position Pt is a negative direction (– direction).

The command value setting module 223 may set a throttle command value according to a combination of the error distance e and the approaching speed $-\Delta e$. The command value setting module 223 may output the throttle command value to the propelling force generator 91. The propelling force generator 91 may control a propelling force according to the throttle command value.

As illustrated in FIG. 3B, the steering angle controlling module 23 may include a target direction calculating module 231, a deviation angle calculating module 232, and a steering angle setting module 233.

The target direction calculating module 231 may calculate a target direction $\psi t$ based on the target position Pt and the ship position P. The deviation angle calculating module 232 may calculate a deviation angle $\Delta \psi$ by subtracting a hull direction (stern direction) w from the target direction wt. The steering angle setting module 233 may set a command rudder angle for bringing the hull direction w closer to the target direction $\psi t$, for example, by performing a proportional control according to the magnitude of the deviation angle $\Delta \psi$.

The steering angle setting module 233 may output the command rudder angle to the rudder mechanism 92. The rudder mechanism 92 may control a steering angle according to the command rudder angle.

The AP user interface 30 may be implemented by, for example, a touch panel, or a physical button or switch. The AP user interface 30 may receive an operation of settings associated with the autopilot control including a fixed-point hold. The AP user interface 30 may output the contents of settings, such as the target position Pt, to the AP controller 20.

The sensor 40 may measure a ship position P, a ship speed V, and a hull direction w (a heading or bow direction and/or a stern direction) of the ship (hull) provided with the hull control device 10. For example, the sensor 40 may be implemented by a positioning sensor utilizing positioning signals from a GNSS (e.g., GPS), an inertia sensor (an acceleration sensor, an angular velocity sensor, etc.), and/or a magnetic sensor.

The display unit 50 may be implemented by, for example, a liquid crystal panel etc. The display unit 50 may display information on the fixed-point hold, information associated with the autopilot control, etc., inputted from the AP controller 20. Note that the display unit 50 may be omitted, however, it is desirable to be provided because a user can easily grasp a fixed-point holding state, an autopilot control state, etc.

(Configuration of Remote Control Lever 102)

The remote control lever 102 may include the control lever 200 and the operating state detector 201.

The control lever 200 may receive an operation from the user during manual navigation. The operating state detector 201 may be implemented by a sensor etc. The operating state detector 201 may detect the operating state of the control lever 200. The operating state detector 201 may output the detected operating state of the control lever (e.g., an angle) to the propelling force generator 91. During the manual navigation, the propelling force generator 91 may generate a propelling force according to the operating state. The operating state may be monitored by the AP controller 20, as described above. For example, the AP controller 20 may perform an initial control of the autopilot control while referring to the operating state, when switching from the manual operation to the autopilot control.

(Fixed-Point Hold Control)

In such control and processing, the AP controller 20 may sequentially set a steering angle command and the throttle command value at a given time interval, and perform the fixed-point control. Here, the AP controller 20 may control so that the stem of the hull 90 hold or maintain a location close to the target position Pt, while the stern is oriented toward an incoming direction of disturbance (disturbance direction).

In order to achieve this, the steering angle controlling module 23 may set the steering angle command as described above. In parallel to the steering angle control, the ship speed controlling module 22 may perform specifically the following processing.

As a fundamental concept of the control, the ship speed controlling module 22 may change the setting of the throttle command value according to whether the hull 90 is located within a target range (define by the circle CRt) set by the target position Pt and the control start position P0, or near the control start position P0, or outside the target range. In other words, the ship speed controlling module 22 may differentiate the setting of the throttle command value between the inside and the outside the boundary of the target range (an inner segment and an outer segment, respectively).

Further, the ship speed controlling module 22 may change the setting of the throttle command value according to whether the hull 90 approaches the target position Pt or separates from the target position Pt, or a distance to the target position Pt hardly changes.

That is, the ship speed controlling module 22 may combine the location of the hull 90 with respect to the target position (a location with respect to the target range), and the behavior of the hull 90 to the target position Pt, and set the throttle command value for every combination.

Figure 4:
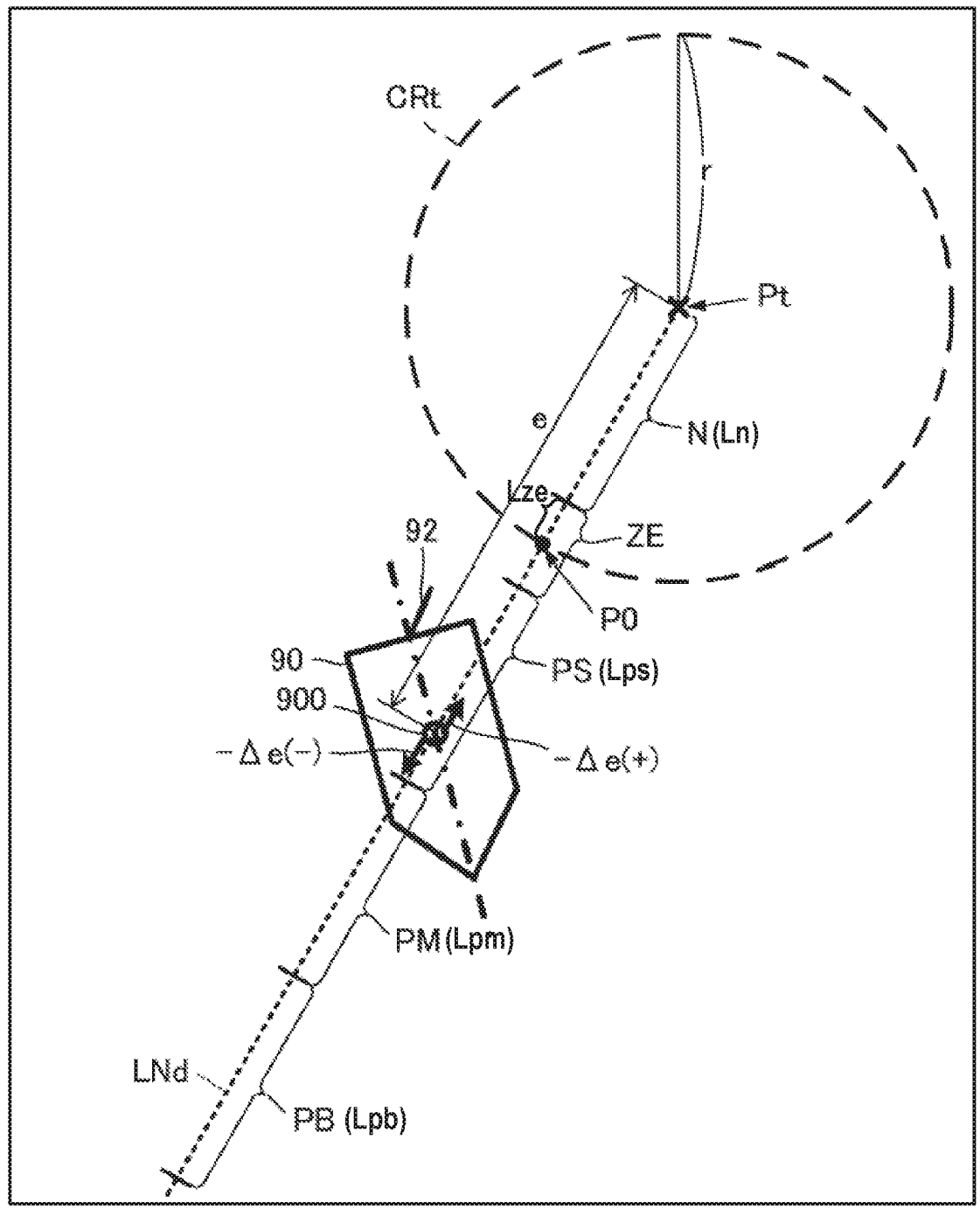
FIG. 4 is a view illustrating a concept of a hull controlling method according to the first embodiment.

FIG. 4 is a view illustrating a concept of the hull controlling method according to the first embodiment. The ship speed controlling module 22 may set the control start position P0 for the target position Pt given from the main controlling module 21. The control start position P0 may be a point on the circle CRt having a radius r centering on the target position Pt. The circle CRt may be referred to as a "target range" of the present disclosure. The radius r of the circle CRt can be set according to, for example, the magnitude of the disturbance, the performance of the propelling force (propulsion) of the ship, etc. Moreover, the radius r may be set by the user.

The ship speed controlling module 22 may set an intersection of a straight line LNd which connects the current location of the hull 90 (ship position P) with the target position Pt, and the circle CRt, as the control start position P0. That is, the ship speed controlling module 22 may set the intersection of the straight line LNd which is parallel to the target direction ψt and passes through a control reference position 900 of the hull 90, and the circle CRt, as the control start position P0. The control start position P0 may be referred to as a "boundary of the target range" of the present disclosure. As described above, the ship speed controlling module 22 may calculate the error distance e based on the target position Pt and the ship position P, and set the error distance e with respect to the control start position P0.

The ship speed controlling module 22 may set locations on the straight line LNd as a plurality of sections N, ZE, PS, PM, and PB. In other words, the ship speed controlling module 22 may set the plurality of sections which include the error distance e as the plurality of sections N, ZE, PS, PM, and PB. The ship speed controlling module 22 may set the section N, the section ZE, the section PS, the section PM, and the section PB from the target position Pt (i.e., from a smaller value of the error distance e). The sections N, ZE, PS, PM, and PB may be defined using the value of the error distance e.

The section ZE may be set as a section at a distance Lze centering on the control start position P0. The section N may be a section on the target position Pt side of the control start position P0, and the sections PS, PM, and PB may be sections away from the target position Pt with respect to the control start position P0.

The section N may be set as a section between a proximal end of the section ZE (an end closer to the target position Pt) and the target position Pt. The sections PS, PM, and PB may be set in this order from the target position Pt side (and the control start position P0 side). A proximal end of the section PS may be in contact with a distal end of the section ZE (an end away from the target position Pt). A distal end of the section PS may be in contact with a proximal end of the section PM, and a distal end of the section PM may be in contact with a proximal end of the section PB. A distance Lps of the section PS, a distance Lpm of the section PM, and a distance Lpb of the section PB may be set suitably. For example, the distance Lze of the section ZE may be set shorter than a distance Ln of the section N, the distance Lps of the section PS, the distance Lpm of the section PM, and the distance Lpb of the section PB.

Note that the control start position P0 and the sections N, ZE, PS, PM, and PB may be set by the main controlling module 21. In this case, the main controlling module 21 may give the control start position P0 and the sections N, ZE, PS, PM, and PB to the ship speed controlling module 22, together with the target position Pt.

The ship speed controlling module 22 may calculate the approaching speed $-\Delta e$ based on the negated value of the derivative of the error distance e. The approaching speed $-\Delta e$ may be a speed parallel to the straight line LNd. When approaching to the target position Pt, the approaching speed may become a positive value ($-\Delta e(+)$), and when separating from the target position Pt, the approaching speed may become a negative value ($-\Delta e(-)$).

The ship speed controlling module 22 may set a throttle command value R according to a combination of a first setting condition based on the error distance e and a second setting condition based on the approaching speed $-\Delta e$.

The first setting condition may be determined according to a relation between the error distance e and the plurality of sections N, ZE, PS, PM, and PB.

The ship speed controlling module 22 may set the first setting condition to N, if the error distance e is within the section N. This section N may be referred to as an "inner segment" of the "target range" of the present disclosure. The ship speed controlling module 22 may set the first setting condition to ZE, if the error distance e is within the section ZE. Similarly, the ship speed controlling module 22 may set the first setting condition to PS, PM, and PB, if the error distance e is within the sections PS, PM, and PB, respectively. The section comprised of these sections PS, PM, and PB may be referred to as an "outer segment" of the "target range" of the present disclosure.

The second setting condition may be determined based on whether the approaching speed −Δe is a positive value, substantially 0, or a negative value.

The ship speed controlling module 22 may set the second setting condition to ZEd, if the approaching speed −Δe is substantially 0 (i.e., if the hull 90 hardly approaches or separates from the target position Pt). The detection of the hull 90 hardly approaching or separating from the target position Pt can be achieved by, for example, setting a threshold for an absolute value of the approaching speed −Δe and detecting that the absolute value of the approaching speed −Δe is equal to or below this threshold.

The ship speed controlling module 22 may set the second setting condition to Pd, if the approaching speed −Δe is a positive value and the absolute value of the approaching speed −Δe is above the threshold. That is, the ship speed controlling module 22 may set the second setting condition to Pd, if the hull 90 approaches the target position Pt.

The ship speed controlling module 22 may set the second setting condition to Nd, if the approaching speed −Δe is a negative value and the absolute value of the approaching speed −Δe is above the threshold. That is, the ship speed controlling module 22 may set the second setting condition to Nd, if the hull 90 separates from the target position Pt.

Figures 5A, 5B:
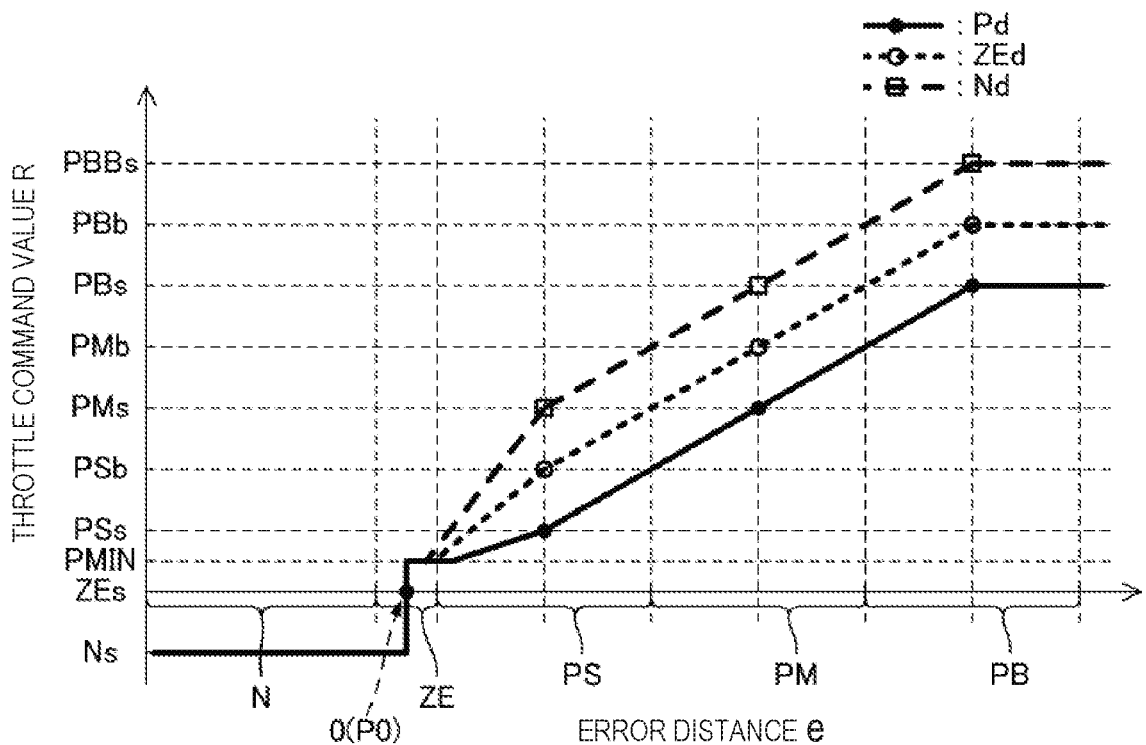
FIG. 5A is a table illustrating one example of setting of a throttle command value R for every combination of setting conditions.
FIG. 5B is a graph illustrating a more concrete example of the setting of the throttle command value R.

FIG. 5A is a table illustrating one example of the setting of the throttle command value R for every combination of setting conditions. FIG. 5B is a graph illustrating a more concrete example of the setting of the throttle command value R.

As illustrated in FIG. 5A, the ship speed controlling module 22 may set the throttle command value R according to a combination of the first setting condition based on the error distance e and a second setting condition based on the approaching speed −Δe.

(When Ship Approaches Target Position Pt)

When the ship approaches the target position Pt, the second setting condition may be Pd.

The ship speed controlling module 22 may set the throttle command value R to Ns, if the first setting condition is N. Ns corresponds to, for example, a minimum value of the thrust or propulsion force in a forward throttle (a throttle operation for propelling the ship in the bow direction), or a stop of the thrust (ZEs).

The ship speed controlling module 22 may set the throttle command value R to ZEs, if the first setting condition is ZEs. ZEs corresponds to the stop of the thrust.

The ship speed controlling module 22 may set the throttle command value R to PS s, if the first setting condition is PS. The ship speed controlling module 22 may set the throttle command value R to PMs, if the first setting condition is PM. The ship speed controlling module 22 may set the throttle command value R to PB s, if the first setting condition is PB. Here, the throttle command value R has a relation of PSs<PMs<PBs.

That is, when the ship approaches the target position Pt, the ship speed controlling module 22 may set the stop of the thrust or the minimum forward thrust within the inner segment of the target range. Then, the ship speed controlling module 22 may set the stop of the thrust near the boundary of the target range.

In the outer segment of the target range, the ship speed controlling module 22 may set a larger rearward thrust as the error distance e (the distance from the target position Pt to the control reference position 900 of the hull 90) increases (i.e., as the ship separates more from the target position Pt).

(When Ship Hardly Approaches and Separates from Target Position Pt (When Approaching Speed is Substantially 0))

When the approaching speed of the ship to the target position Pt is substantially 0, the second setting condition may be ZEd.

The ship speed controlling module 22 may set the throttle command value R to Ns, if the first setting condition is N. The ship speed controlling module 22 may set the throttle command value R to ZEs, if the first setting condition is ZE. Ns and ZEs may be the same as those when the second setting condition is Pd.

The ship speed controlling module 22 may set the throttle command value R to PSb, if the first setting condition is PS. The ship speed controlling module 22 may set the throttle command value R to PMb, if the first setting condition is PM. The ship speed controlling module 22 may set the throttle command value R to PBb, if the first setting condition is PB. Here, the throttle command value R has a relation of PSb<PMb<PBb.

That is, also when the approaching speed of the ship to the target position Pt is substantially 0, the ship speed controlling module 22 may set the stop of the thrust or the minimum forward thrust in the inner segment of the target range. Then, the ship speed controlling module 22 may set the stop of the thrust near the boundary of the target range.

In the outer segment of the target range, the ship speed controlling module 22 may set a larger rearward thrust as the error distance e (the distance from the target position Pt to the control reference position 900 of the hull 90) increases (i.e., as the ship separates from the target position Pt).

Here, the throttle command value R has a relation of PSb>PSs, PMb>PMs, and PBb>PBs. Therefore, when the second setting condition is ZEd, the ship speed controlling module 22 may set as a larger rearward thrust, as compared with the case of Pd. That is, when the approaching speed of the ship to the target position Pt is substantially 0, the ship speed controlling module 22 may set a larger rearward thrust, as compared with the case where the ship approaches the target position Pt.

(When Ship Separates from Target Position Pt)

When the ship separates from the target position Pt, the second setting condition may be Nd.

The ship speed controlling module 22 may set the throttle command value R to Ns, if the first setting condition is N. The ship speed controlling module 22 may set the throttle command value R to ZEs, if the first setting condition is ZE. Ns and ZEs may be the same as those when the second setting condition is Pd.

The ship speed controlling module 22 may set the throttle command value R to PMs, if the first setting condition is PS. The ship speed controlling module 22 may set the throttle command value R to PBs, if the first setting condition is PM. The ship speed controlling module 22 may set the throttle command value R to PBBs, if the first setting condition is PB. Here, the throttle command value R has a relation of PSs<PMs<PBs<PBBs, and therefore, it may be a relation of PMs>PSb, PBs>PMb, and PBBs>PBb.

That is, also when the ship separates from the target position Pt, the ship speed controlling module 22 may set the stop of the thrust or the minimum forward thrust in the inner segment of the target range. Then, the ship speed controlling module 22 may set the stop of the thrust near the boundary of the target range.

In the outer segment of the target range, the ship speed controlling module 22 may set a larger rearward thrust as the error distance e (the distance from the target position Pt to the control reference position 900 of the hull 90) increases (i.e., as the ship separates from the target position Pt).

Here, the throttle command value R has a relation of PMs>PSb, PBs>PMb, and PBBs>PBb, as described above. Therefore, when the second setting condition is Nd, the ship speed controlling module 22 may set a larger rearward thrust, as compared with the case of Pd and ZEd. That is, when the ship separates from the target position Pt, the ship speed controlling module 22 may set a larger rearward thrust, as compared with the cases where the approaching speed of the ship to the target position Pt is substantially 0 and where the ship approaches the target position Pt.

By performing such a control of the ship speed, the throttle command value (thrust) may be set so that the ship flows outside the target range by the disturbance etc. when the ship is inside the target range. Then, when the ship exits outside the target range, the throttle command value (thrust) may be set so that the ship returns inside the target range. The throttle command value (thrust) may be set larger as the distance of the ship from the target position Pt increases. Further, the throttle command value (thrust) may be set smaller as the speed at which the ship approaches the target position Pt (vector magnitude) increases.

Therefore, the hull control device 10 can control the hull 90 so that the hull 90 stays in the target range as much as possible, i.e., the hull 90 may be held at the fixed point substantially close to the target position Pt (a range near the target position Pt).

Note that, the ship speed controlling module 22 may set the throttle command value R according to the rule, as described above, in which the first setting condition and the second setting condition are combined. However, as illustrated in FIG. 5B, it is more desirable that the throttle command value R for the error distance e is set using a linear interpolation. The ship speed controlling module 22 achieves the linear interpolation, for example, by the following method.

The ship speed controlling module 22 may set the throttle command value R of each of the sections PS, PM, and PB in the table described above to the throttle command value R at the center position of each of the sections PS, PM, and PB. The ship speed controlling module 22 may carry out the linear interpolation of the throttle command values R at the center positions of the sections PS, PM, and PB, and set as the throttle command values R at the locations of the sections PS, PM, and PB, respectively. Moreover, the ship speed controlling module 22 may set a straight line passing through the center of the section PS and the control start position P0 from the center position of the section PS to the location of the control start position P0, may set the throttle command value by the straight line in the sections larger than PMIN corresponding to the minimum thrust, and may set the throttle command value to PMIN in the sections smaller than PMIN.

Note that, in a part of the section ZE closer to the target position Pt than the control start position P0, and in the section N, the ship speed controlling module 22 may set the throttle command value R to Ns, regardless of the location in the sections.

By using such settings of the throttle command value, the ship speed controlling module 22 can perform the ship speed control corresponding further in detail to the location of the ship with respect to the target position Pt.

By the above configuration, the hull control device 10 can maintain the hull at the substantially fixed point, for example, in the hull control with the simple structure like the 1-shaft 1-rudder ship.

(Hull Controlling Method)

Figure 6:
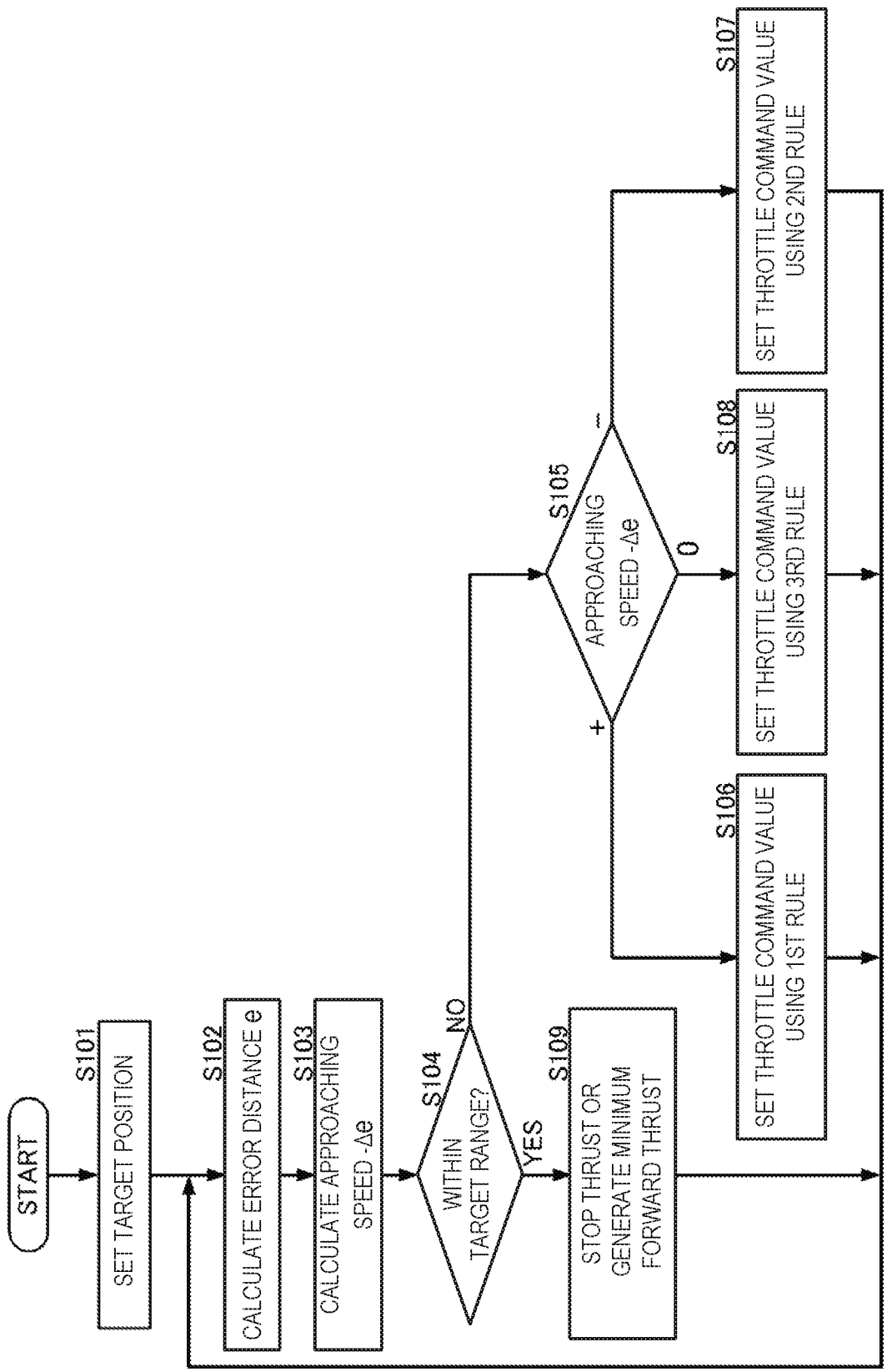
FIG. 6 is a flowchart illustrating the hull controlling method according to the first embodiment.

In the above description, the AP controller 20 may be divided into a plurality of functional parts, and the functional parts may perform the control for fixed-point hold. However, the functions of the AP controller 20 may be established and stored as programs, and the programs may be executed by the processor. In this case, for example, a hull controlling method illustrated in FIG. 6 may be used. FIG. 6 is a flowchart illustrating the hull controlling method according to the first embodiment. Note that, in the detail of each processing illustrated in the flowchart, the contents which can be easily understood by the above description are omitted. Below, the processor is described as a subject.

The processor may set the target position Pt (Step S101). Note that the target position Pt can be set from other devices mounted on the ship, other than by the user.

The processor may calculate the error distance e based on the target position Pt and the ship position P (Step S102). The processor may calculate the approaching speed −Δe based on the error distance e (Step S103).

If the processor detects that the ship is within the target range based on the error distance e (Step S104: YES), it may set the throttle command value for the stop of the thrust or the minimum forward thrust (Step S109).

If the processor detects that the ship is not within the target range based on the error distance e (Step S104: NO) and the approaching speed −Δe is a positive value (Step S105: "+"), the processor may set the throttle command value using a first rule (Step S106). The first rule may be the rule when the second setting condition is Pd.

If the processor detects that the ship is not within the target range based on the error distance e (Step S104: NO), and the approaching speed −Δe is a negative value (Step S105: "−"), the processor may set the throttle command value using a second rule (Step S107). The second rule may be the rule when the second setting condition is Nd.

If the processor detects that the ship is not within the target range based on the error distance e (Step S104: NO), and the approaching speed −Δe is substantially 0 (Step S105: "0"), the processor may set the throttle command value using a third rule (Step S108). The third rule may be the rule when the second setting condition is ZEd.

Second Embodiment

Figure 7:
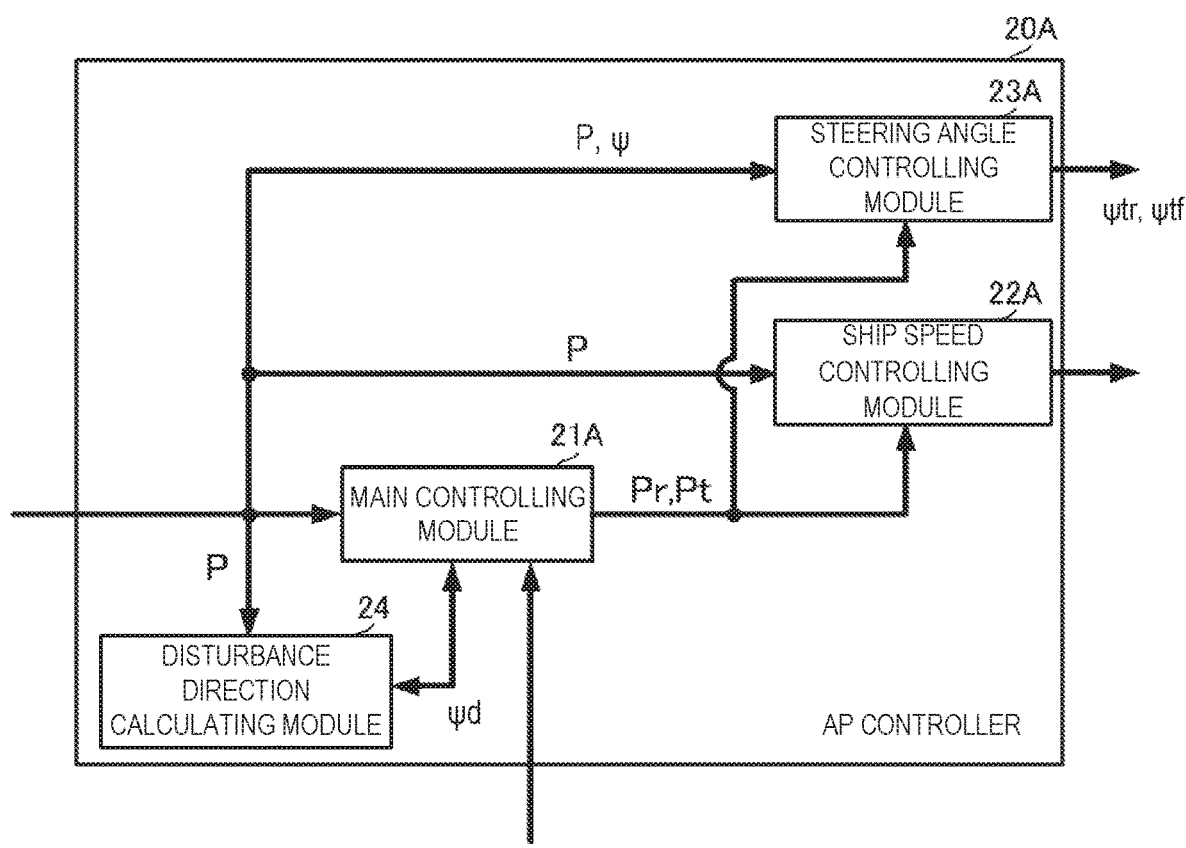
FIG. 7 is a functional block diagram illustrating a configuration of an autopilot controller (AP controller) according to a second embodiment.

A hull control device, a hull controlling method, and a hull control program according to a second embodiment of the present disclosure is described with reference to the drawings. FIG. 7 is a functional block diagram illustrating a configuration of an autopilot controller (AP controller) according to the second embodiment.

The hull control device 10A according to the second embodiment may differ in the configuration and processing of an AP controller 20A from the hull control device 10 according to the first embodiment. Other configurations of the hull control device 10A according to the second embodiment may be similar to those of the hull control device 10 according to the first embodiment, and description of the similar parts is omitted.

As illustrated in FIG. 7, the AP controller 20A may include a main controlling module 21A, a ship speed controlling module 22A, a steering angle controlling module 23A, and a disturbance direction calculating module 24. The ship speed controlling module 22A may be referred to as a "control switching module" of the present disclosure.

The disturbance direction calculating module 24 may calculate the disturbance direction ψd, for example, based on an average movement direction of the ship position P. The average movement direction can easily be calculated based on a temporal change in the ship position P. The disturbance direction calculating module 24 may output the disturbance direction ψd to the main controlling module 21A.

The main controlling module 21A may set the ship position P at a start timing of the fixed-point control as the control start position P0. The main controlling module 21A may set a target position Pr for the rearward control and a target position Pf for the forward control based on the disturbance direction ψd and the control start position P0. The rearward control and the forward control may be referred to as a "first control" and a "second control" of the present disclosure, respectively. Moreover, the target position Pr for the rearward control may be referred to as a "first target position" of the present disclosure, and the target position Pf for the forward control may be referred to as a "second target position" of the present disclosure.

In more detail, the main controlling module 21A may set the target position Pr for the rearward control at a location which is located on a straight line passing through the control start position P0 and is parallel to the disturbance direction ψd, and is separated from the control start position P0 on the disturbance side by a given distance. Moreover, the main controlling module 21A may set the target position Pf for the forward control at a location which is located on a straight line passing through the control start position P0 and is parallel to the disturbance direction ψd, and is separated from the control start position P0 on the opposite side from the disturbance side by a given distance. The target position Pr for the rearward control and the target position Pf for the forward control may be set at symmetrical locations with respect to the control start position P0.

The main controlling module 21A may give the target position Pr for the rearward control and the target position Pf for the forward control to the ship speed controlling module 22A and the steering angle controlling module 23A.

During the rearward control, the steering angle controlling module 23A may set a target direction ψtr by using the target position Pr for the rearward control, and perform the steering angle control described above. During the forward control, the steering angle controlling module 23A may set a target direction ψtf by using the target position Pf for the forward control, and perform the steering angle control described above.

The ship speed controlling module 22A may perform the ship speed control, while switching alternately the rearward control using the target position Pr and the forward control using the target position Pf. Here, during the rearward control, the ship speed controlling module 22A may set the throttle command value using a combination of an error distance eR with respect to the target position Pr and an approaching speed −ΔeR comprised of a negated value of a derivative of the error distance eR. Moreover, during the forward control, the ship speed controlling module 22A may set the throttle command value using a combination of an error distance eF with respect to the target position Pf and an approaching speed −ΔeF comprised of a negated value of a derivative of the error distance eF.

Figure 8:
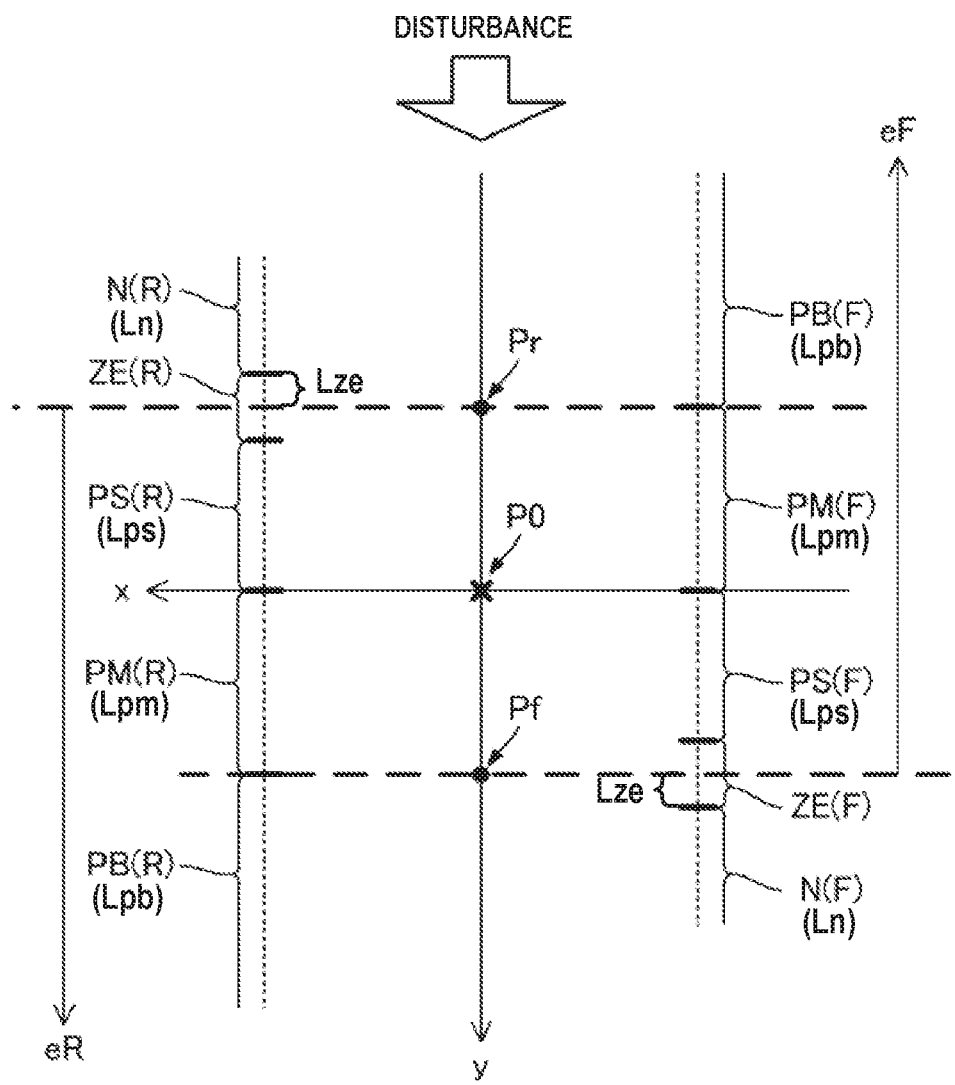
FIG. 8 is a view illustrating a relation between each setting location and a section of a hull controlling method according to the second embodiment.
Figure 9A:
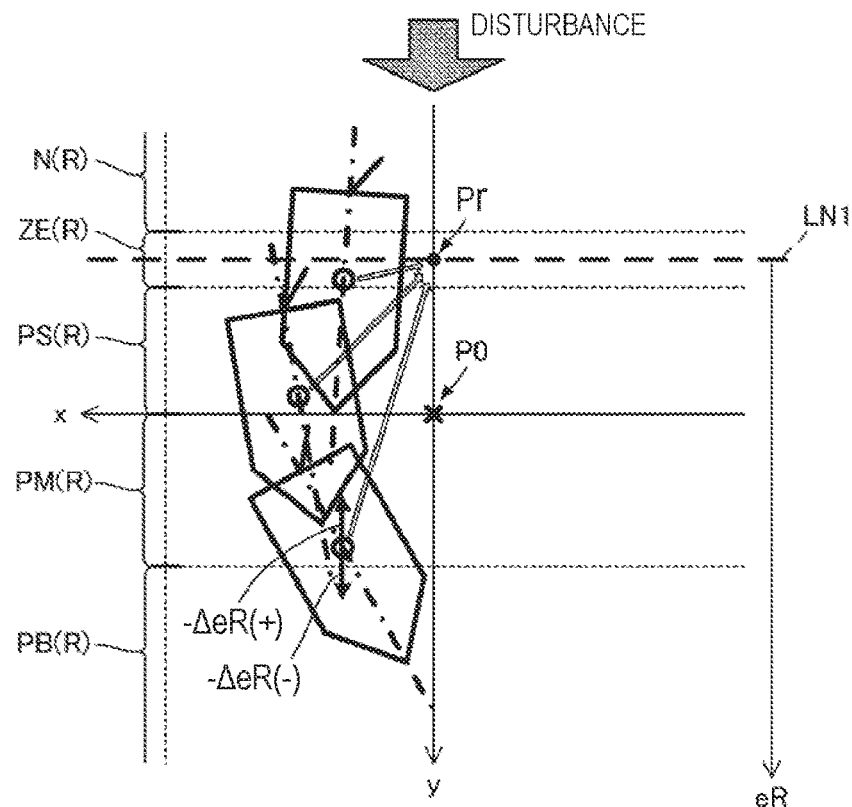
FIG. 9A is a view illustrating a concept of a rearward control of the hull controlling method according to the second embodiment.
Figure 9B:
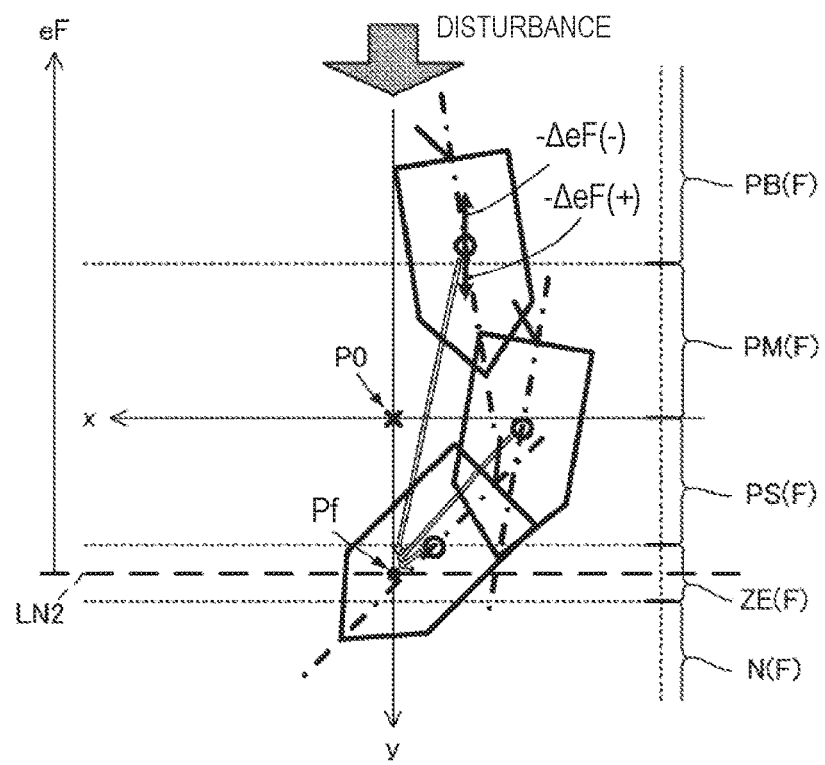
FIG. 9B is a view illustrating a concept of a forward control of the hull controlling method according to the second embodiment.

In more detail, the throttle command value may be set as follows during the rearward control and the forward control. FIG. 8 is a view illustrating a relation between each setting location and the section of the hull controlling method according to the second embodiment. FIG. 9A is a view illustrating a concept of the rearward control of the hull controlling method according to the second embodiment, and FIG. 9B is a view illustrating a concept of the forward control of the hull controlling method according to the second embodiment.

As illustrated in FIG. 8, the main controlling module 21A may set a control coordinate system in which the control start position P0 is used as an origin of this coordinate system. In the control coordinate system, an axis which passes through the control start position P0 and is parallel to the disturbance direction ψd is set as y-axis. The main controlling module 21A may set an axis which passes through the control start position P0 and is perpendicular to the y-axis as x-axis. The main controlling module 21A may set a location which is on the y-axis and is separated on the incoming side of the disturbance from the control start position P0 by a given distance as the target position Pr for the rearward control. The main controlling module 21A may set a location which is located on the y-axis and is separated on the opposite side of the incoming side of the disturbance from the control start position P0 by a given distance as the target position Pf for the forward control.

(Rearward Control)

As illustrated in FIGS. 8 and 9A, during the rearward control, the main controlling module 21A may calculate the error distance eR for the rearward control while setting a direction parallel to the y-axis and away from the disturbance as the positive direction. The main controlling module 21A may calculate the error distance eR based on a distance between the ship position P and the target position Pr along the y-axis.

Moreover, during the rearward control, the ship speed controlling module 22A may set locations on the y-axis as a plurality of sections N(R), ZE(R), PS(R), PM(R), and PB(R). In other words, the ship speed controlling module 22A may set a plurality of sections including the error distance eR as the plurality of sections N(R), ZE(R), PS(R), PM(R), and PB(R). The ship speed controlling module 22A may set the sections N(R), ZE(R), PS(R), PM(R), and PB(R) in the ascending order of the error distance eR (from the closer side to the disturbance). Then, the sections N(R), ZE(R), PS(R), PM(R), and PB(R) may be defined using the value of the error distance eR.

The section ZE(R) may be set as a section at the distance Lze centering on the target position Pr. The section N(R) may be a section on the incoming side of the disturbance with respect to the target position Pr, and the sections PS(R), PM(R), and PB(R) may be sections on the opposite side from the incoming side of the disturbance with respect to the target position Pr.

A distal end of the section N(R) (an end on the opposite side of the incoming side of the disturbance) may be in contact with a proximal end (an end on the incoming side of the disturbance) of the section ZE(R). The sections PS(R), PM(R), and PB(R) may be set in this order from the side closer to the target position Pr. A proximal end of the section PS(R) may be in contact with a distal end of the section ZE(R). A distal end of the section PS(R) may be in contact with a proximal end of the section PM(R), and a distal end of the section PM(R) may be in contact with a proximal end of the section PB(R). The distance Lps of the section PS(R), the distance Lpm of the section PM(R), and the distance Lpb of the section PB(R) may be set suitably. For example, the distance Lze of the section ZE(R) may be set shorter than the distance Ln of the section N(R), the distance Lps of the section PS(R), the distance Lpm of the section PM(R), and the distance Lpb of the section PB(R).

Note that, as a concrete example, the sections PS(R), PM(R), and PB(R) may be set as follows. The distal end of the section PS(R) and the proximal end of the section PM(R) may be located at the control start position P0, and the distal end of the section PM(R) and the proximal end of the section PB(R) may be located at the target position Pf.

Moreover, during the rearward control, the ship speed controlling module 22A may calculate the approaching speed −ΔeR based on the negated value of the derivative of the error distance eR. The approaching speed −ΔeR may be a speed parallel to the y-axis. When approaching the target position Pr (when moving in the negative direction of the y-axis), the approaching speed may become a positive value (−ΔeR(+)), and when separating from the target position Pr (when moving in the positive direction of the y-axis), the approaching speed may become a negative value (−ΔeR(−)).

The ship speed controlling module 22A may set the throttle command value R according to the combination of a first setting condition for the rearward control based on the error distance eR and a second setting condition for the rearward control based on the approaching speed −ΔeR.

The first setting condition for the rearward control may be determined based on a relation between the error distance eR and the plurality of sections N(R), ZE(R), PS(R), PM(R), and PB(R).

The ship speed controlling module 22A may set the first setting condition for the rearward control to N(R), if the error distance eR is in the section N(R). The ship speed controlling module 22A may set the first setting condition for the rearward control to ZE(R), if the error distance eR is in the section ZE(R). Similarly, the ship speed controlling module 22A may set the first setting condition for the rearward control to PS(R), PM(R), and PB(R), if the error distance eR is in the sections PS(R), PM(R), and PB(R), respectively.

The second setting condition for the rearward control may be determined based on whether the approaching speed −ΔeR is the positive value, substantially 0, or the negative value.

The ship speed controlling module 22A may set the second setting condition for the rearward control to ZEdr, if the approaching speed −ΔeR is substantially 0 (i.e., the hull 90 hardly approaches and separates from the target position Pr). The detection of the hull 90 hardly approaching or separating from the target position Pr can be achieved by, for example, setting a threshold for an absolute value of the approaching speed −ΔeR and detecting that the absolute value of the approaching speed −ΔeR is equal to or below this threshold.

The ship speed controlling module 22A may set the second setting condition for the rearward control to Pdr, if the approaching speed −ΔeR is the positive value and the absolute value of the approaching speed −ΔeR is above the threshold. That is, the ship speed controlling module 22A may set the second setting condition for the rearward control to Pdr, if the hull 90 moves in the negative direction of the y-axis (if the hull 90 moves toward the disturbance).

The ship speed controlling module 22A may set the second setting condition for the rearward control to Ndr, if the approaching speed −ΔeR is the negative value and the absolute value of the approaching speed −ΔeR is above the threshold. That is, the ship speed controlling module 22A may set the second setting condition for the rearward control to Ndr, if the hull 90 moves in the positive direction of the y-axis (if the hull 90 moves in the disturbance direction).

Figures 10A, 10B:
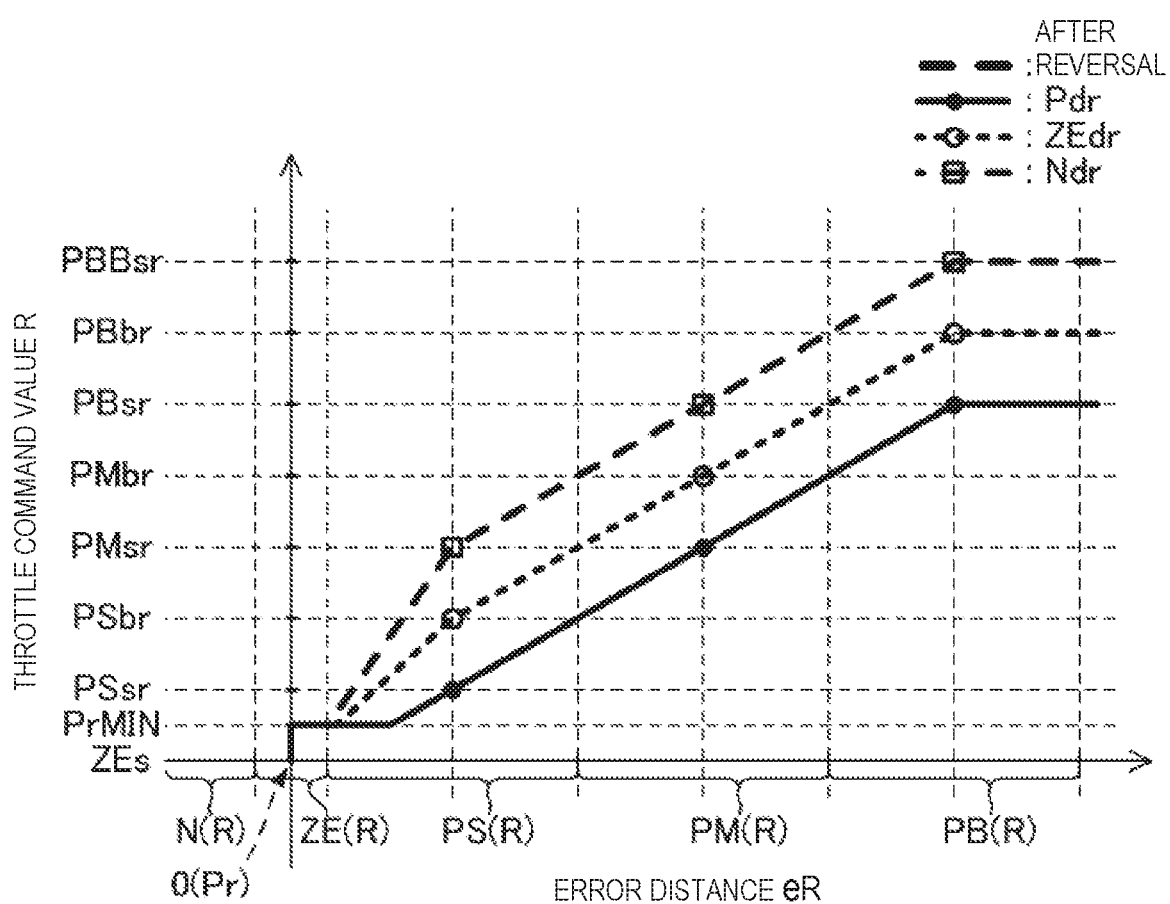
FIG. 10A is a table illustrating one example of setting of the throttle command value R for every combination of the setting conditions during the rearward control.
FIG. 10B is a graph illustrating a more concrete example of the setting of the throttle command value R during the rearward control.

FIG. 10A is a table illustrating one example of the setting of the throttle command value R for every combination of the setting conditions during the rearward control. FIG. 10B is a graph illustrating a more concrete example of the setting of the throttle command value R during the rearward control.

As illustrated in FIG. 10A, the ship speed controlling module 22A may set the throttle command value R according to a combination of the first setting condition for the rearward control based on the error distance eR and the second setting condition for the rearward control based on the approaching speed −ΔeR.
(When Ship Moves in Negative Direction of Y-axis (When Ship Moves Toward Disturbance))

When the ship is located on the control start position P0 side of the target position Pr and approaches the target position Pr, the ship may move in the negative direction of the y-axis and the second setting condition for the rearward control may be Pdr.

The ship speed controlling module 22A may set the throttle command value R to ZEs, if the first setting condition for the rearward control is ZE(R). ZEs corresponds to the stop of the thrust.

The ship speed controlling module 22A may set the throttle command value R to PSsr, if the first setting condition for the rearward control is PS(R). The ship speed controlling module 22A may set the throttle command value R to PMsr, if the first setting condition for the rearward control is PM(R). The ship speed controlling module 22A may set the throttle command value R to PBsr, if the first setting condition for the rearward control is PB(R). Here, the throttle command value R has a relation of PSsr<PMsr<PBsr.

That is, when the ship approaches the target position Pr, the ship speed controlling module 22A may set the stop of the thrust, if the ship is located near the target position Pr. Then, when the ship is located on the control start position P0 side of the target position Pr, the ship speed controlling module 22A may set a larger rearward thrust as the error distance eR increases (i.e., as the ship separates from the target position Pr).

On the other hand, the ship speed controlling module 22A may set the throttle command value R to PBf, if the first setting condition is N(R) (i.e., if the ship is located on the incoming side of the disturbance with respect to the target position Pr). PBf may be a throttle command value when switching the throttle from rearward to forward, and may be suitably set according to the ship's specification etc.
(When Ship Hardly Moves on Y-Axis (when Approaching Speed is Substantially 0))

When the ship is located on the control start position P0 side of the target position Pr and the approaching speed of the ship to the target position Pr is substantially 0, the second setting condition for the rearward control may be ZEdr.

The ship speed controlling module 22A may set the throttle command value R to ZEs, if the first setting condition for the rearward control is ZE(R). ZEs corresponds to the stop of the thrust. The ship speed controlling module 22A may set the throttle command value R to PSbr, if the first setting condition for the rearward control is PS(R). The ship speed controlling module 22A may set the throttle command value R to PMbr, if the first setting condition for the rearward control is PM(R). The ship speed controlling module 22A may set the throttle command value R to PBbr, if the first setting condition for the rearward control is PB(R). Here, the throttle command value R has a relation of PSbr<PMbr<PBbr.

That is, also when the approaching speed of the ship to the target position Pr is substantially 0, the ship speed controlling module 22A may set the stop of the thrust, if the ships is located near the target position Pr.

When the ship is located on the control start position P0 side of the target position Pr, the ship speed controlling module 22A may set a larger rearward thrust as the error distance eR (a distance of the control reference position 900 of the hull 90 from the target position Pr) increases (i.e., as the ship separates from the target position Pr).

Here, the throttle command value R has a relation of PSbr>PSsr, PMbr>PMsr, and PBbr>PBsr. Therefore, when the second setting condition for the rearward control is ZEdr, the ship speed controlling module 22A may set a larger rearward thrust, as compared with the case of Pdr. That is, when the approaching speed of the ship to the target position Pr is substantially 0, the ship speed controlling module 22A may set a larger rearward thrust, as compared with the case where the ship approaches the target position Pr.

On the other hand, if the first setting condition for the rearward control is N(R) (i.e., if the ship is located on the incoming side of the disturbance with respect to the target position Pr), the ship speed controlling module 22A may set the throttle command value R to PBf.

(When Ship Moves in Positive Direction of y-axis (When Ship Moves in Disturbance Direction))

When the ship is located on the control start position P0 side of the target position Pr and separates from the target position Pr, the ship may move in the positive direction of the y-axis and the second setting condition for the rearward control may be Ndr.

The ship speed controlling module 22A may set the throttle command value R to ZEs, if the first setting condition for the rearward control is ZE(R). ZEs corresponds to the stop of the thrust.

The ship speed controlling module 22A may set the throttle command value R to PMsr, if the first setting condition for the rearward control is PS(R). The ship speed controlling module 22A may set the throttle command value R to PBsr, if the first setting condition for the rearward control is PM(R). The ship speed controlling module 22A may set the throttle command value R to PBBsr, if the first setting condition for the rearward control is PB(R). Here, the throttle command value R has a relation of PMsr<PBsr<PBB r.

That is, even when the ship separates from the target position Pr, the ship speed controlling module 22A may set the stop of the thrust, if the ship is located near the target position Pr. Then, when the ship is located on the control start position P0 side of the target position Pr, the ship speed controlling module 22A may set a larger rearward thrust as the error distance eR increases (i.e., the ship separates from the target position Pr).

Here, the throttle command value R has a relation of PMsr>PSbr, PBsr>PMbr, and PBBsr>PBbr. Therefore, when the second setting condition for the rearward control is Ndr, the ship speed controlling module 22A may set a larger rearward thrust, as compared with the case of ZEdr. That is, when the ship separates from the target position Pr, the ship speed controlling module 22A may set a larger rearward thrust, as compared with the cases where the approaching speed of the ship to the target position Pr is substantially 0 and where the ship approaches the target position Pr.

On the other hand, if the first setting condition is N(R) (i.e., if the ship is located on the incoming side of the disturbance with respect to the target position Pr), the ship speed controlling module 22A may switch the control to the forward control.

Note that the ship speed controlling module 22A may set the throttle command value R according to the rule, as described above, in which the first setting condition for the rearward control and the second setting condition for the rearward control are combined. However, as illustrated in FIG. 10B, it is more desirable to set the throttle command value R for the error distance eR by a linear interpolation. The linear interpolation executed by the ship speed controlling module 22A during the rearward control may be similar to the linear interpolation executed by the ship speed controlling module 22.

(Forward Control)

During the forward control, as illustrated in FIGS. 8 and 9B, the main controlling module 21A may calculate an error distance eF for the forward control, while setting a direction parallel to the y-axis and toward the disturbance as the positive direction. The main controlling module 21A may calculate the error distance eF according to a distance between the ship position P and the target position Pf along the y-axis.

Moreover, during the forward control, the ship speed controlling module 22A may set locations on the y-axis as a plurality of sections N(F), ZE(F), PS(F), PM(F), and PB(F). In other words, the ship speed controlling module 22A may set a plurality of sections including the error distance eF as the plurality of sections N(F), ZE(F), PS(F), PM(F), and PB(F). The ship speed controlling module 22A may set the sections N(F), ZE(F), PS(F), PM(F), and PB(F) from a small error distance eF side (the opposite side of the incoming side of the disturbance). The sections N(F), ZE(F), PS(F), PM(F), and PB(F) may be defined using the value of the error distance eF.

The section ZE(F) may be set as a section at the distance Lze centering on the target position Pf. The section N(F) may be a section on the opposite side of the incoming side of the disturbance with respect to the target position Pf, and the sections PS(F), PM(F), and PB(F) may be sections on the incoming side of the disturbance with respect to the target position Pf.

A proximal end (an end on the incoming side of the disturbance) of the section N(F) may be in contact with a distal end (an end on the opposite side of the incoming side of the disturbance) of the section ZE(F). The sections PS(F), PM(F), and PB(F) may be set in this order from the side closer to the target position Pf. A distal end of the section PS(F) may be in contact with a proximal end of the section ZE(F). A proximal end of the section PS(F) may be in contact with a distal end of the section PM(F), and a proximal end of the section PM(F) may be in contact with a distal end of the section PB(F). The distance Lps of the section PS(F), the distance Lpm of the section PM(F), and the distance Lpb of the section PB(F) may be set suitably. For example, the distance Lze of the section ZE(F) may be set shorter than the distance Ln of the section N(F), the distance Lps of the section PS(F), the distance Lpm of the section PM(F), and the distance Lpb of the section PB(F).

Note that, as a concrete example, the sections PS(F), PM(F), and PB(F) may be set, for example, as follows. The proximal end of the section PS(F) and the distal end of the section PM(F) may be located at the control start position P0 on the y-axis. The proximal end of the section PM(F) and the distal end of the section PB(F) may be located at the target position Pr on the y-axis.

Moreover, during the forward control, the ship speed controlling module 22A may calculate an approaching speed $-\Delta eF$ based on a negated value of a derivative of the error distance eF. The approaching speed $-\Delta eF$ may be a speed parallel to the y-axis. When the ship approaches the target position Pf (when moving in the positive direction of the y-axis), the approaching speed may become the positive value ($-\Delta eF(+)$), and when the ship separates from the target position Pf (when moving in the negative direction of the y-axis), the approaching speed may become the negative value ($-\Delta eF(-)$).

The ship speed controlling module 22A may set the throttle command value R according to a combination of a first setting condition for the forward control based on the error distance eF and a second setting condition for the forward control based on the approaching speed $-\Delta eF$.

The first setting condition for the forward control may be determined according to a relation between the error distance eF and the plurality of sections N(F), ZE(F), PS(F), PM(F), and PB(F).

The ship speed controlling module 22A may set the first setting condition for the forward control to N(F), if the error distance eF is in the section N(F). The ship speed controlling module 22A may set the first setting condition for the forward control to ZE(F), if the error distance eF is in the section ZE(F). Similarly, the ship speed controlling module 22A may set the first setting condition for the forward control to PS(F), PM(F), and PB(F), if the error distance eF is in sections PS(F), PM(F), and PB(F), respectively.

The second setting condition for the forward control may be determined based on whether the approaching speed $-\Delta eF$ is the positive value, substantially 0, or the negative value.

The ship speed controlling module 22A may set the second setting condition for the forward control to ZEdf, if the approaching speed $-\Delta eF$ is substantially 0 (i.e., the hull 90 hardly approaches and separates from the target position Pf). The detection of the hull 90 hardly approaching or separating from the target position Pf can be achieved by setting a threshold for an absolute value of the approaching speed $-\Delta eF$ and detecting that the absolute value of the approaching speed $-\Delta eF$ is equal to or below this threshold, for example.

The ship speed controlling module 22A may set the second setting condition for the forward control to Pdf, if the approaching speed $-\Delta eF$ is the positive value and the absolute value of the approaching speed $-\Delta eF$ is above the threshold. That is, the ship speed controlling module 22A may set the second setting condition for the forward control to Pdf, if the hull 90 moves in the positive direction of the y-axis (if the hull 90 moves in the disturbance direction).

The ship speed controlling module 22A may set the second setting condition for the forward control to Ndf, if the approaching speed $-\Delta eF$ is the negative value and the absolute value of the approaching speed $-\Delta eF$ is above the threshold. That is, the ship speed controlling module 22A may set the second setting condition for the forward control to Ndf, if the hull 90 moves in the negative direction of the y-axis (if the hull 90 moves toward the disturbance).

Figures 11A, 11B:
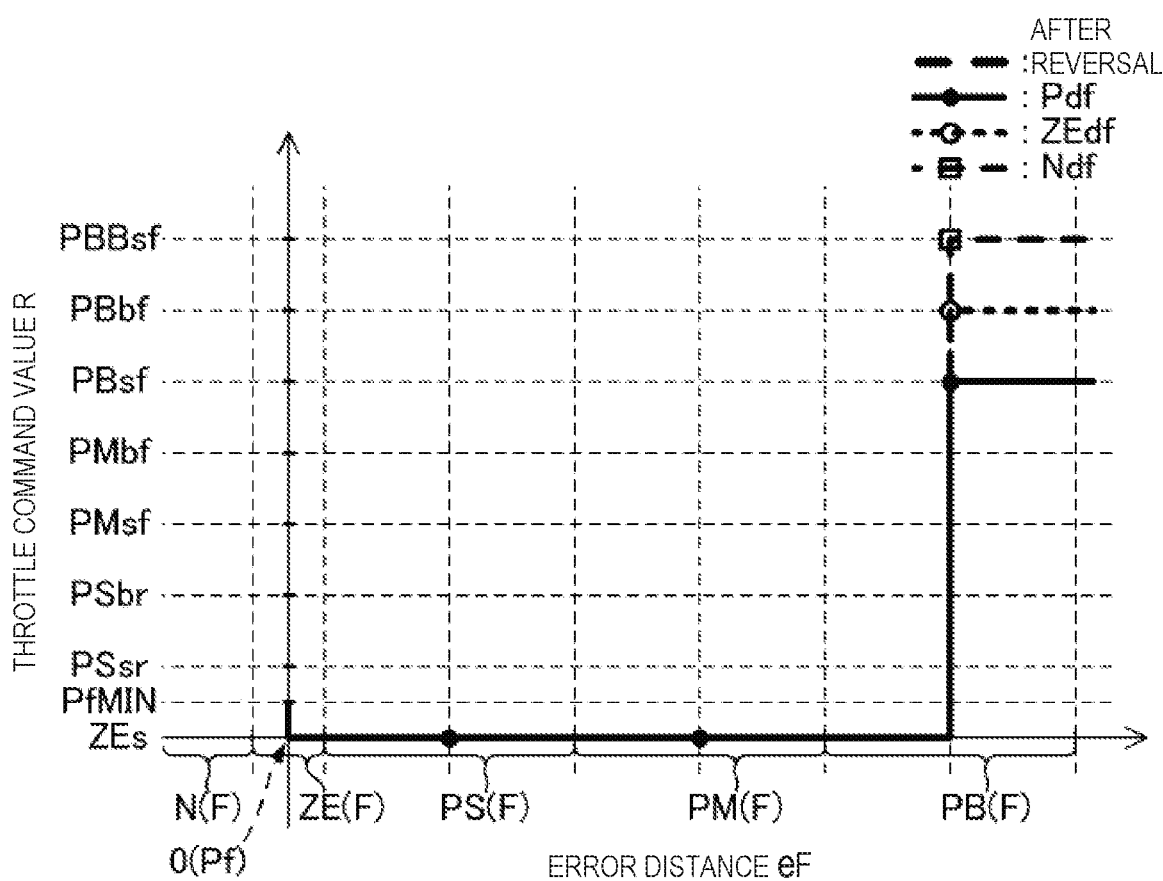
FIG. 11A is a table illustrating one example of setting of the throttle command value R for every combination of the setting conditions during the forward control.
FIG. 11B is a graph illustrating a more concrete example of the setting of the throttle command value R during the forward control.

FIG. 11A is a table illustrating one example of setting of the throttle command value R for every combination of the setting conditions during the forward control. FIG. 11B is a graph illustrating a more concrete example of the setting of the throttle command value R during the forward control.

As illustrated in FIG. 11A, the ship speed controlling module 22A may set the throttle command value R according to a combination of the first setting condition for the forward control based on the error distance eF and the second setting condition for the forward control based on the approaching speed $-\Delta eF$.

(When Ship Moves in Positive Direction of Y-Axis (when Ship Moves in Disturbance Direction))

When the ship is located on the control start position P0 side of the target position Pf and approaches the target position Pf, the ship may move in the positive direction of the y-axis and the second setting condition for the forward control may be Pdf.

The ship speed controlling module 22A may set the throttle command value R to ZEs, if the first setting condition for the forward control is ZE(F), PS(F), and PM(F). ZEs corresponds to the stop of the thrust. The ship speed controlling module 22A may set the throttle command value R to PBsf, if the first setting condition for the forward control is PB(F).

That is, when the ship approaches the target position Pf, the ship speed controlling module 22A may set the stop of the thrust, if the ship is not separated greatly from the target position Pf. Then, if the ship is located on the control start position P0 side of the target position Pf and is separated greatly from the target position Pf (e.g., if the ship is located on the incoming side of the disturbance with respect to the target position Pr), the ship speed controlling module 22A may set the forward thrust.

On the other hand, if the first setting condition for the forward control is N(F) (i.e., if the ship is located on the opposite side of the target position Pf from the incoming side of the disturbance), the ship speed controlling module 22A may set the throttle command value R to PBr. PBr may be a throttle command value when switching the throttle from forward to rearward, and may be suitably set according to the ship's specification etc.

(When Ship Hardly Moves on Y-Axis (When Approaching Speed is Substantially 0))

When the ship is located on the control start position P0 side of the target position Pf and the approaching speed of the ship to the target position Pf is substantially 0, the second setting condition for the forward control may be ZEdf.

The ship speed controlling module 22A may set the throttle command value R to ZEs, if the first setting condition for the forward control is ZE(F), PS(F), and PM(F). ZEs corresponds to the stop of the thrust. The ship speed controlling module 22A may set the throttle command value R to PBbf, if the first setting condition for the forward control is PB(F). Here, the throttle command value R has a relation of PBbf>PBsf.

That is, also when the approaching speed of the ship to the target position Pf is substantially 0, the ship speed controlling module 22A may set the stop of the thrust, if the ship is not separated greatly from the target position Pf. If the ship is located on the control start position P0 side of the target position Pf and is separated greatly from the target position Pf (e.g., if the ship is located on the incoming side of the disturbance with respect to the target position Pr), the ship speed controlling module 22A may set the forward thrust. Here, when the approaching speed of the ship to the target position Pf is substantially 0, the ship speed controlling module 22A may set the throttle command value so as to generate a larger forward thrust than the case where the ship approaches the target position Pf.

On the other hand, if the first setting condition for the forward control is N(F) (i.e., if the ship is located on the opposite side of the target position Pf from the incoming side of the disturbance), the ship speed controlling module 22A may switch the throttle from forward to rearward and set the throttle command value R to PBr.

(When Ship Moves in Negative Direction of Y-axis (Ship Moves Toward Disturbance))

When the ship is located on the control start position P0 side of the target position Pf and is separated from the target position Pf, the ship may move in the negative direction of the y-axis, and the second setting condition for the forward control may be Ndf.

The ship speed controlling module 22A may set the throttle command value R to ZEs, if the first setting condition for the forward control is ZE(F), PS(F), and PM(F). ZEs corresponds to the stop of the thrust. The ship speed controlling module 22A may set the throttle command value R to PBBsf, if the first setting condition for the forward control is PB(F). Here, the throttle command value R has a relation of PBBsf>PBbf.

That is, even when the ship separates from the target position Pf, the ship speed controlling module 22A may set the stop of the thrust, if the ship is not separated greatly from the target position Pf. If the ship is located on the control start position P0 side of the target position Pf and is separated greatly from the target position Pf (e.g., if the ship is located on the incoming side of the disturbance with respect to the target position Pr), the ship speed controlling module 22A may set the forward thrust. Here, when the ship separates from the target position Pf, the ship speed controlling module 22A may set the throttle command value so as to generate a larger forward thrust than the cases where the approaching speed of the ship to the target position Pf is substantially 0 and where the ship approaches the target position Pf.

On the other hand, if the first setting condition for the forward control is N(F) (i.e., if the ship is located on the opposite side of the target position Pf from the incoming side of the disturbance), the ship speed controlling module 22A may switch the throttle from forward to rearward and set the throttle command value R to PBr.

Note that the ship speed controlling module 22A may set the throttle command value R based on the rule, as described above, in which the first setting condition for the forward control and the second setting condition for the forward control are combined. However, the throttle command value R for the error distance eF may be set as illustrated in FIG. 11B. In this case, if the error distance eF is smaller than the distance corresponding to the center position of the section PB(F), the ship speed controlling module 22A may set the throttle command value to ZEs, regardless of the condition of the second setting condition for the forward control. On the other hand, if the error distance eF is equal to or more than the distance corresponding to the center position of the section PB(F), the ship speed controlling module 22A may set the throttle command value according to the second setting condition for the forward control.

By performing such a control, as illustrated in FIGS. 9A and 9B, the hull may substantially stay in a certain section between the target position Pr and the target position Pt, in a direction substantially parallel to the disturbance direction. That is, the hull control device 10A can substantially maintain the hull 90 within an area near the target position of the fixed-point control, while using the control start position P0 as the target position of the fixed-point control. The hull control device 10A can achieve such a fixed-point hold, for example, by using the simple structure, such as the 1-shaft 1-rudder system.

(Hull Controlling Method)

Figure 12:
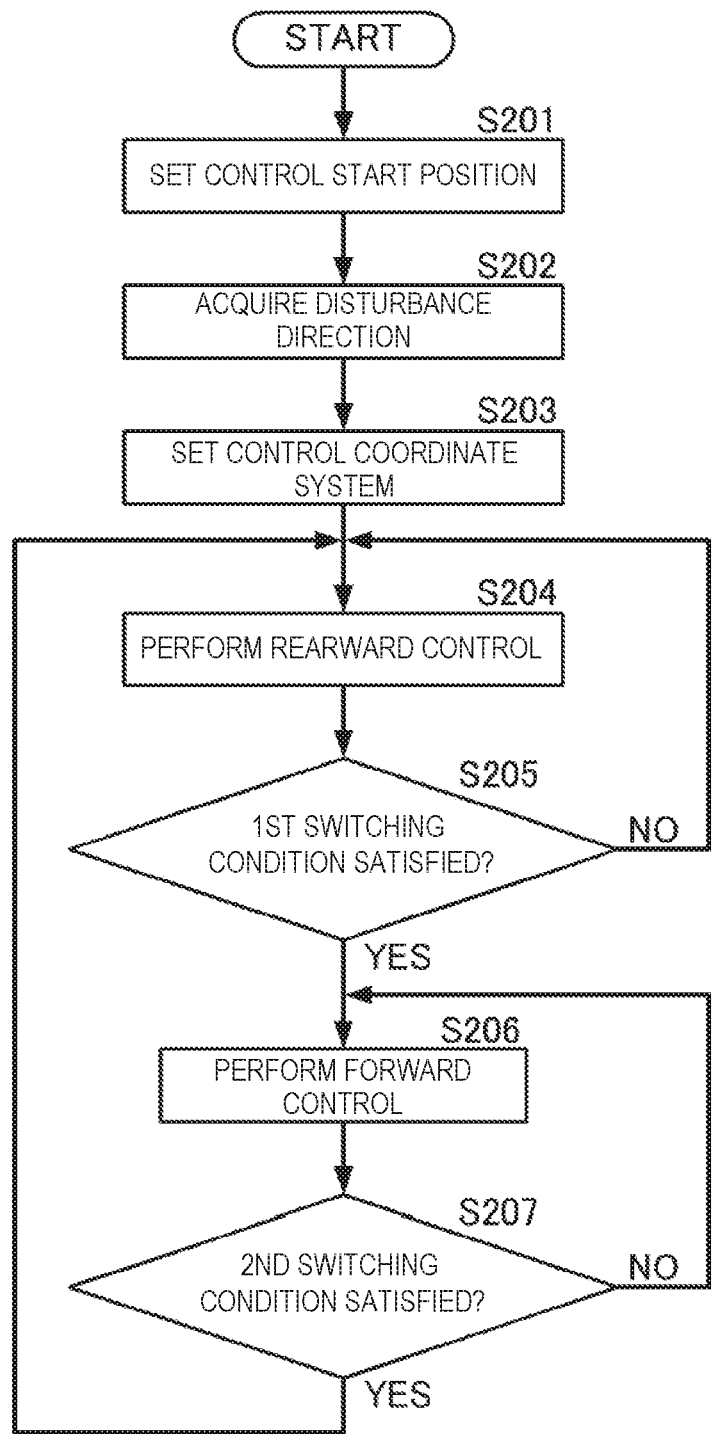
FIG. 12 is a flowchart illustrating the hull controlling method according to the second embodiment.
Figure 13:
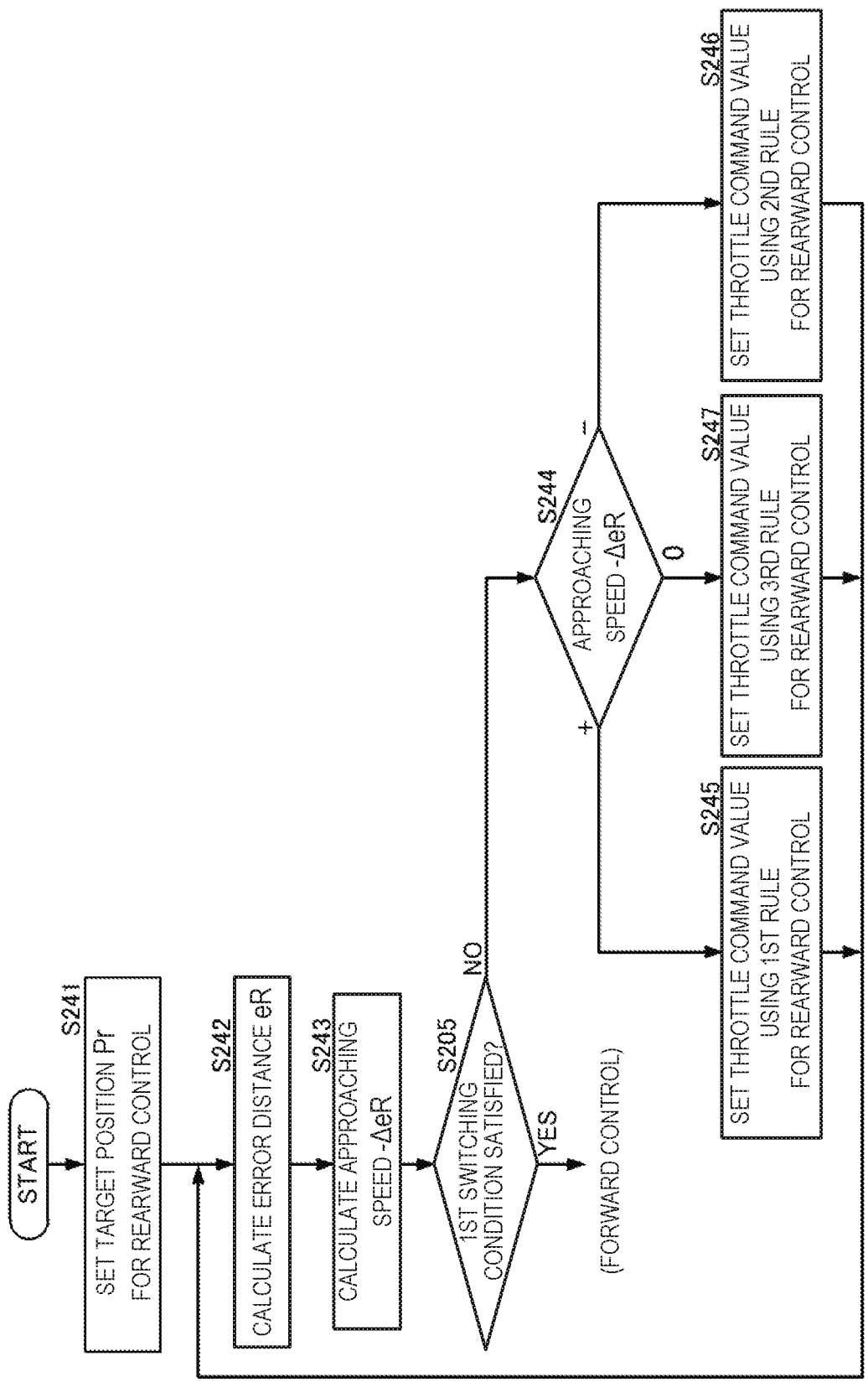
FIG. 13 is a flowchart illustrating one example of the rearward control according to the second embodiment.
Figure 14:
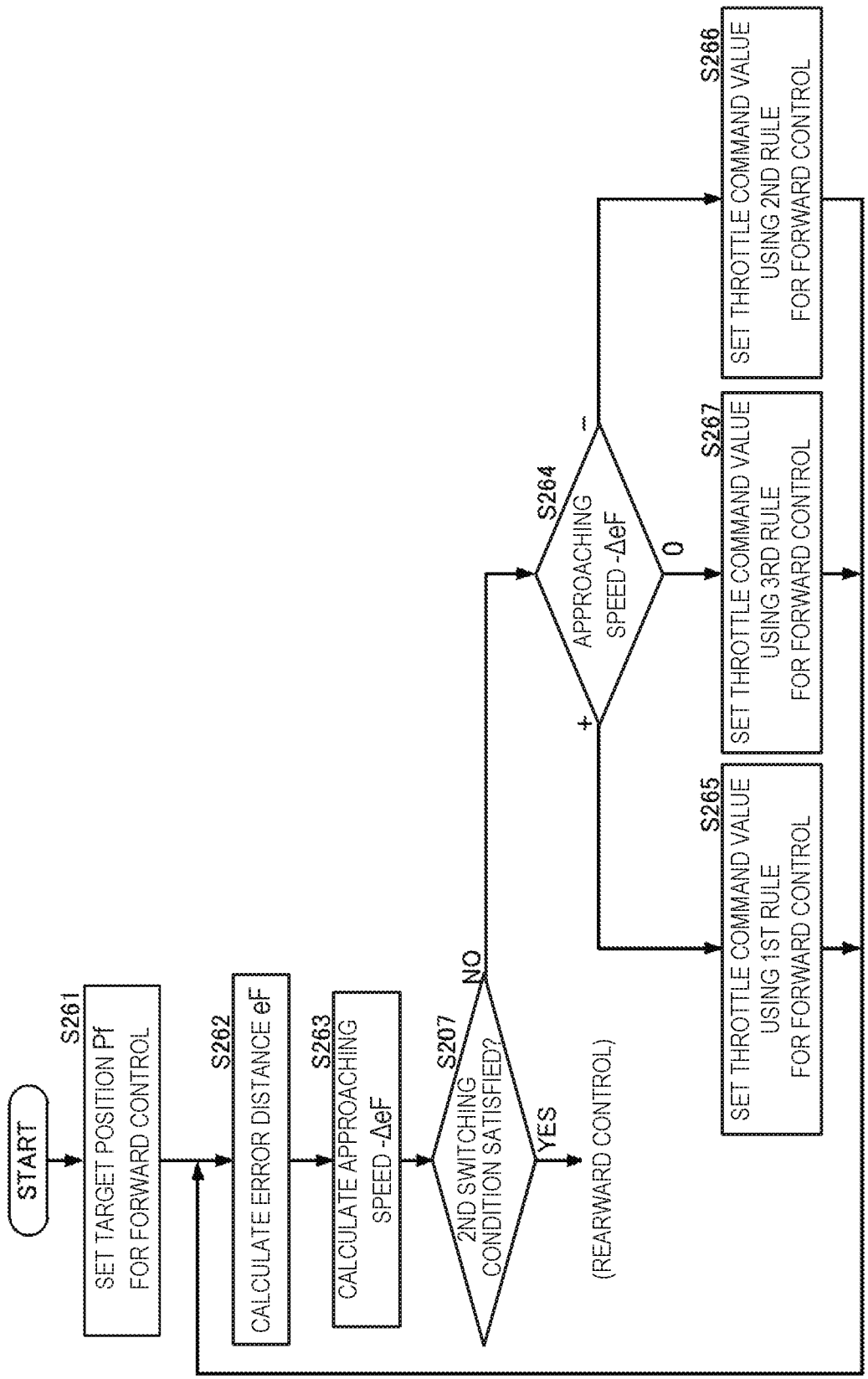
FIG. 14 is a flowchart illustrating one example of the forward control according to the second embodiment.

In the above description, the control for the fixed-point hold may be performed while dividing the AP controller 20A into the plurality of functional parts. However, the functions of the AP controller 20A may be stored as programs, and the program may be executed by a processor. In this case, hull controlling methods illustrated in FIGS. 12, 13, and 14 may be used. FIG. 12 is a flowchart illustrating a hull controlling method according to the second embodiment. FIG. 13 is a flowchart illustrating one example of the rearward control according to the second embodiment. FIG. 14 is a flowchart illustrating one example of the forward control according to the second embodiment. Note that, in the detail of each processing illustrated in the flowchart, the contents which can be easily understood by the above description is omitted. Below, the processor is described as a subject.

(Main Control)

As illustrated in FIG. 12, the processor may receive a setting of the control start position P0 (Step S201). The control start position P0 is, for example, set as the ship position P at a start timing of the control.

The processor may detect, for example, an average movement direction of the ship position P, and acquire the disturbance direction ψd based on the average movement direction (Step S202). The processor may set a control coordinate system using the disturbance direction ψd (Step S203).

Since the hull 90 is drifted by the disturbance at this moment, the processor may perform the rearward control using the target position Pr for the rearward control (Step S204). A concrete example of the rearward control will be described later using FIG. 13.

The processor may continue the rearward control (Step S204), while not satisfying a first switching condition (Step S205: NO). For example, the processor determines that the first switching condition is satisfied by detecting that, during the rearward control, the ship crosses a straight line which passes through the target position Pr and is perpendicular to the y-axis of the control coordinate system (a first switch borderline (first reference line) LN1) to the disturbance side from the control start position P0 side. The processor can detect that the ship crosses the first switch borderline LN1 by observing a change in the error distance eR. For example, the processor can detect that the ship crosses the first switch borderline LN1 based on the error distance eR being changed from a positive value to a negative value.

If the first switching condition is satisfied (Step S205: YES), the processor may switch the control from the rearward control to the forward control, and perform the forward control (Step S206). A concrete example of the forward control will be described later using FIG. 14.

While not satisfying a second switching condition (Step S207: NO), the processor may continue the forward control (Step S206). For example, the processor determines that the second switching condition is satisfied by detecting that, during the forward control, the ship crosses a straight line which passes through the target position Pf and is perpendicular to the y-axis of the control coordinate system (a second switch borderline (second reference line) LN2) to the opposite side of the disturbance from the control start position P0 side. The processor can detect that the ship crosses the second switch borderline LN2 by observing the change in the error distance eF. For example, the processor can detect that the ship crosses the second switch borderline LN2 based on the error distance eF being changed from a positive value to a negative value.

If the second switching condition is satisfied (Step S207: YES), the processor may switch the control from the forward control to the rearward control, and perform the rearward control (Step S204).

After that, the processor may switch between the rearward control and the forward control according to the determination result using the first switching condition and the second switching condition.

(Rearward Control)

The processor may set the target position Pr for the rearward control (Step S241).

The processor may calculate the error distance eR based on the target position Pr for the rearward control and the ship position P (Step S242). The error distance eR may be calculated as a clearance between the target position Pr for the rearward control and the ship position P in a direction parallel to the y-axis. The processor may calculate the approaching speed $-\Delta eR$ based on the error distance eR (Step S243).

If the first switching condition is satisfied (Step S205: YES), the processor may switch the control to the forward control.

If the first switching condition is not satisfied (Step S205: NO), and the approaching speed $-\Delta eR$ is a positive value (Step S244: "+"), the processor may set the throttle command value using a first rule for the rearward control (Step S245). The first rule for the rearward control may be a rule when the second setting condition for the rearward control is Pdr as described above.

If the first switching condition is not satisfied (Step S205: NO), and the approaching speed $-\Delta eR$ is a negative value (Step S244: "−"), the processor may set the throttle command value using a second rule for the rearward control (Step S246). The second rule for the rearward control may be a rule when the second setting condition is Ndr as described above.

If the first switching condition is not satisfied (Step S205: NO), and the approaching speed $-\Delta eR$ is substantially 0 (Step S244: "0"), the processor may set the throttle command value using a third rule for the rearward control (Step S247). The third rule for the rearward control may be a rule when the second setting condition is ZEdr as described above.

(Forward Control)

The processor may set the target position Pf for the forward control (Step S261).

The processor may calculate the error distance eF based on the target position Pf for the forward control and the ship position P (Step S262). The error distance eF may be calculated as a clearance between the target position Pf for the forward control and the ship position P in a direction parallel to the y-axis. The processor may calculate the approaching speed $-\Delta eF$ based on the error distance eF (Step S263).

If the second switching condition is satisfied (Step S207: YES), the processor may switch the control to the rearward control.

If the second switching condition is not satisfied (Step S207: NO), and the approaching speed $-\Delta eF$ is a positive value (Step S264: "+"), the processor may set the throttle command value using a first rule for the forward control (Step S265). The first rule for the forward control may be a rule when the second setting condition for the forward control is Pdf.

If the second switching condition is not satisfied (Step S207: NO), and the approaching speed $-\Delta eF$ is a negative value (Step S264: "−"), the processor may set the throttle command value using a second rule for the forward control (Step S266). The second rule for the forward control may be a rule when the second setting condition is Ndf.

If the second switching condition is not satisfied (Step S207: NO), and the approaching speed $-\Delta eF$ is substantially 0 (Step S264: "0"), the processor may set the throttle command value using a third rule for the forward control (Step S267). The third rule for the forward control may be a rule when the second setting condition is ZEdf.

(Correction of Hull Direction)

Figure 15A:
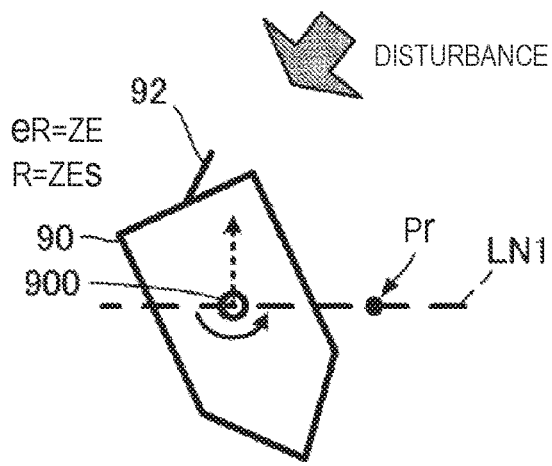
FIGS. 15A to 15C are views illustrating a concept of a correction of a hull direction.
Figure 15B:
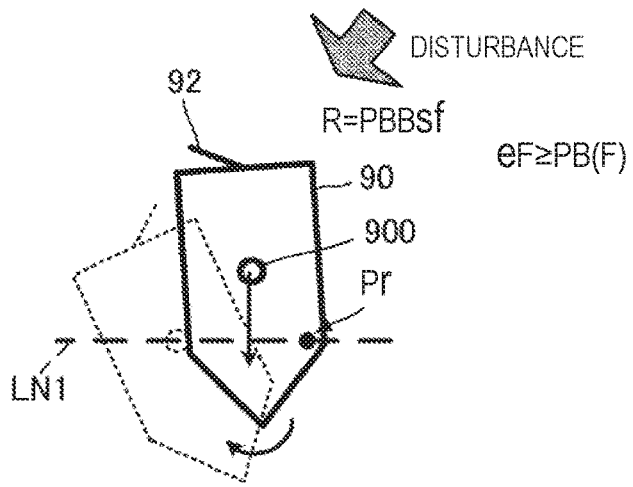
Figure 15C:
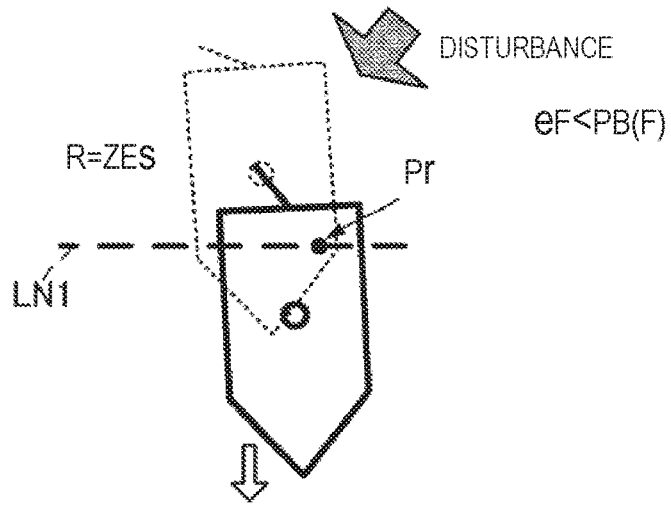

The hull control device 10A having the above configuration may be further capable of correcting the hull direction during the switching of the control from the rearward control to the forward control. FIGS. 15A, 15B, and 15C are views illustrating a concept of the correction of the hull direction. The hull direction may be corrected while changing the state in the order of FIGS. 15A, 15B, and 15C. Note that, below, the AP controller 20A is described as a subject of the control.

As illustrated in FIG. 15A, the AP controller 20A may detect that the first switching condition is satisfied. That is, the AP controller 20A may detect that the hull 90 (in more detail, for example, the control reference position 900 of the hull 90) reaches the first switch borderline LN1 from the control start position P0 side by the rearward control. In detail, the AP controller 20A may detect the arrival at the first switch borderline LN1, for example, based on the error distance eR entering into the section ZE.

At this time, the AP controller 20A may set the throttle command value R to ZEs. That is, the AP controller 20A may stop the thrust. Here, even if the thrust is stopped, the hull 90 may be drifted to the disturbance side of the target position Pr by the inertia.

Next, as illustrated in FIG. 15B, the AP controller 20A may command a turn to the rudder mechanism 92. In detail, as illustrated in FIGS. 15A and 15B, the AP controller 20A may set the steering angle command so that the rudder mechanism 92 changes its state from a state where it is oriented toward the incoming direction of the disturbance to a state where it is oriented toward the opposite direction. For example, the AP controller 20A may perform the steering at timing where the error distance eF enters into the section PB(F). By this steering, the hull 90 may turn.

Further, at this timing, as illustrated in FIG. 15B, the AP controller 20A may set PBBsf as the throttle command value R. That is, the AP controller 20A may generate a large forward thrust at this timing. Therefore, a turning force of the hull 90 may become stronger to turn the hull 90 more. Then, the hull direction may be controlled so that the stern direction of the hull 90 and the disturbance direction approach a state where they are parallel to each other.

Next, as illustrated in FIG. 15C, the AP controller 20A may detect that the hull 90 crosses the first switch borderline LN1 toward the control start position P0 side by the forward control. In detail, for example, the AP controller 20A may detect that the error distance eF exits from the section PB(F).

The AP controller 20A may temporarily set the throttle command value R to ZEs. That is, the AP controller 20A may temporarily stop the thrust.

After that, the AP controller 20A may perform the forward control.

By performing such a control, while performing the control of the fixed-point hold, the control can be corrected so that the stern direction of the hull 90 becomes more parallel to the incoming direction of the disturbance. Then, since the stern direction of the hull 90 can be more parallel to the incoming direction of the disturbance, for example, the ship speed can be controlled with sufficient accuracy to obtain a desired ship speed, and therefore, the performance of the fixed-point control improves.

Figure 16:
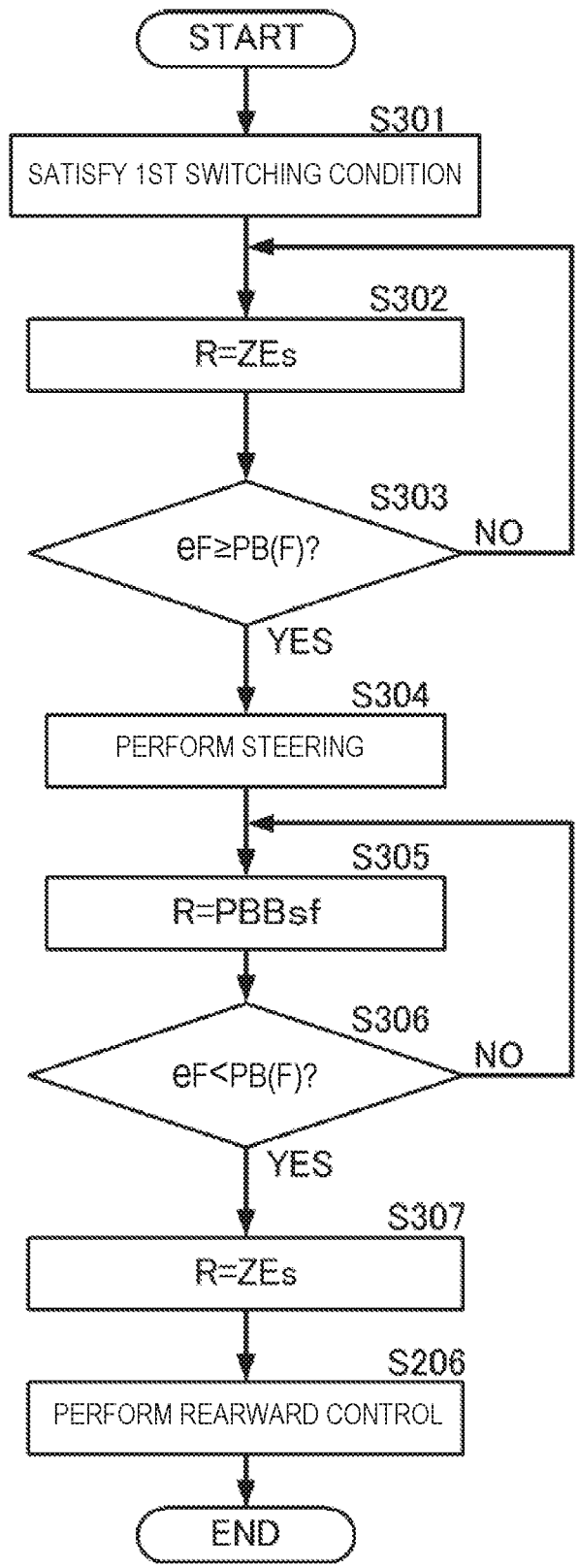
FIG. 16 is a flowchart illustrating a correcting method of the hull direction.

Such a control can also be achieved by storing the control as a program and executing this program by the processor. FIG. 16 is a flowchart illustrating a correcting method of the hull direction.

As illustrated in FIG. 16, if the processor detects that the first switching condition is satisfied (Step S301), it may set the throttle command value R to ZEs (Step S302).

The processor may set the throttle command value R to ZEs (Step S302), until the error distance eF enters into the section PB(F) (Step S303: NO).

If the error distance eF enters into the section PB(F) (Step S303: YES), the processor may perform the control of steering (Step S304). Further, the processor may set the throttle command value R to PBBsf (Step S305).

The processor may set the throttle command value R to PBBsf (Step S305), until the error distance eF exits from the section PB(F) (Step S306: NO).

If the error distance eF exits from the section PB(F) (Step S306: YES), the processor may temporarily set the throttle command value R to ZEs (Step S307), and perform the rearward control (Step S206).
(Update of Control Coordinate System)

Figure 17A:
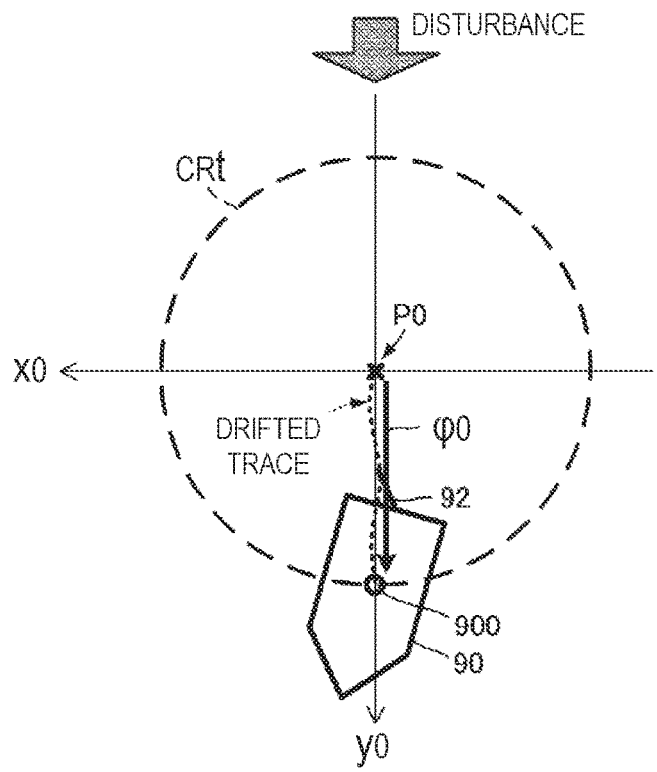
FIGS. 17A and 17B are views illustrating update states of a disturbance direction and a control coordinate system.
Figure 17B:
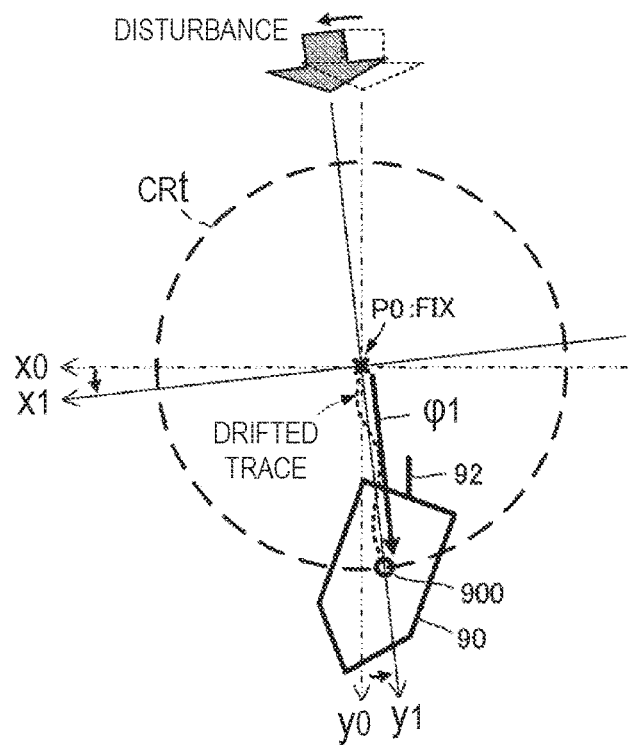

The hull control device 10A having the above configuration may be capable of performing an update of the disturbance direction and an update of the control coordinate system. FIGS. 17A and 17B are views illustrating update states of the disturbance direction and the control coordinate system. Note that, below, the AP controller 20A is described as a subject of the control.

As illustrated in FIG. 17A, the hull 90 may be drifted substantially in the incoming direction of the disturbance (disturbance direction). For example, as illustrated in FIG. 17A, the AP controller 20A may observe a change in the ship position P until the control reference position 900 of the hull 90 reaches a contour of the circle CRt at a given distance (radius r) from the control start position P0. The AP controller 20A may calculate an average movement direction $\varphi 0$, for example, as illustrated in FIG. 17A, based on the change in the ship position P.

The AP controller 20A may calculate the average movement direction, for example, at a given interval, while performing the forward control in the fixed-point control. The hull 90 may receive a drifting force in the disturbance direction by the disturbance. Therefore, it can be defined that the average movement direction and the disturbance direction are substantially parallel to each other. Therefore, the AP controller 20A can perform the same processing as calculating the disturbance direction, by using the average movement direction. In other words, the AP controller 20A can detect the change in the disturbance direction by using the change in the average movement direction.

Then, as illustrated in FIG. 17B, when an average movement direction $\varphi 1$ which is changed from the average movement direction $\varphi 0$ is calculated, the AP controller 20A may update the disturbance direction $\psi d$ and the control coordinate system according to the average movement direction $\varphi 1$. In detail, the AP controller 20A may set the average movement direction $\varphi 1$ as the disturbance direction $\psi d$. The AP controller 20A may set y1-axis parallel to the disturbance direction $\psi d$, and set x1-axis which passes through the control start position P0 and is perpendicular to the y1-axis. That is, the AP controller 20A may update the control coordinate system defined by y0-axis and x0-axis to a control coordinate system defined by the y1-axis and the x1-axis.

Therefore, the AP controller 20A can appropriately set the control coordinate system adapted for the disturbance direction. Therefore, the hull control device 10A can perform the fixed-point control described above more accurately.

Figure 18:
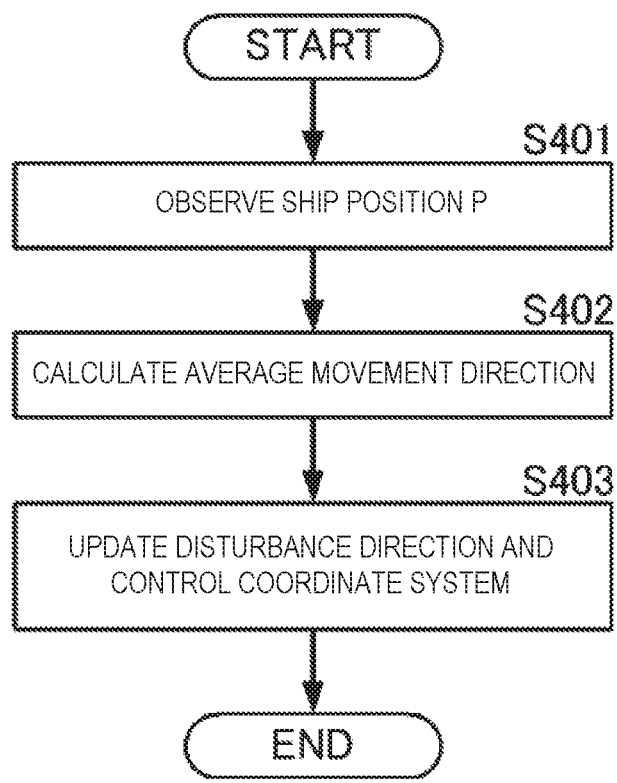
FIG. 18 is a flowchart illustrating an updating method of the disturbance direction and the control coordinate system.

Such a control can also be achieved by storing the control as a program and executing this program by the processor. FIG. 18 is a flowchart illustrating an updating method of the disturbance direction and the control coordinate system.

The processor may observe the ship position P during the forward control of the fixed-point control (Step S401). The processor may calculate the average movement direction based on the observed change in the ship position P (Step S402). The processor may update the disturbance direction and the control coordinate system by using the average movement direction (Step S403).

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An AP controller, comprising:
   processing circuitry configured
   to calculate an error distance between a target position of a fixed-point hold and a ship position;
   to calculate an approaching speed of a ship to the target position;
   to set a throttle command value according to a combination of the error distance and the approaching speed;
   to detect a disturbance direction with respect to the ship; and
   to control a rudder and a propelling force generator of the ship to maintain a stern of the ship oriented toward the disturbance direction.

2. The AP controller of claim 1, wherein
   the processing circuitry is further configured
   to set an inner segment and an outer segment of a target range of the fixed-point hold including the target position; and
   to differentiate the setting of the throttle command value based on whether the error distance is within the inner segment or the outer segment.

3. The AP controller of claim 2, wherein
   the processing circuitry is further configured to set the throttle command value as one of zero and an available minimum value when the error distance is within the inner segment.

4. The AP controller of claim 2, wherein
   the processing circuitry is further configured to set a larger throttle command value as the error distance increases when the error distance is within the outer segment.

5. The AP controller of claim 3, wherein
the processing circuitry is further configured to set the throttle command value as one of zero and the minimum value when a distance between the target position and a boundary of the target range is the same as the error distance.

6. The AP controller of claim 1, wherein
the processing circuitry is further configured to differentiate the setting of the throttle command value based on whether the approaching speed is a positive value or a negative value.

7. The AP controller of claim 6, wherein
the processing circuitry is further configured to set the throttle command value smaller when the approaching speed is the positive value than when the approaching speed is the negative value.

8. The AP controller of claim 6, wherein
the processing circuitry is further configured to differentiate the setting of the throttle command value based on whether the approaching speed is in a substantially 0 range, is the positive value, or is the negative value.

9. The AP controller of claim 1, wherein
the processing circuitry is further configured to sequentially calculate the disturbance direction based on an average movement direction of the ship and updates the disturbance direction.

10. The AP controller of claim 1, wherein
the processing circuitry is further configured
to calculate an angle of deviation between a hull direction of the ship and a target direction of the target position from the ship; and
to set a steering angle based on the angle of deviation.

11. A method of controlling a hull, comprising:
calculating an error distance between a target position of a fixed-point hold and a ship position;
calculating an approaching speed of a ship to the target position;
setting a throttle command value according to a combination of the error distance and the approaching speed;
detecting a disturbance direction with respect to the ship; and
controlling a rudder and a propelling force generator of the ship to maintain a stern of the ship oriented toward the disturbance direction.

12. The method of claim 11, further comprising:
setting an inner segment and an outer segment of a target range of the fixed-point hold including the target position; and
differentiating the setting of the throttle command value based on whether the error distance is within the inner segment or the outer segment.

13. The method of claim 11, further comprising differentiating the setting of the throttle command value based on whether the approaching speed is a positive value or a negative value.

14. A non-transitory computer-readable recording medium storing a program causing a processor of a hull control device to execute processing, the processor configured to control operation of the device, the processing comprising:
calculating an error distance between a target position of a fixed-point hold and a ship position;
calculating an approaching speed of a ship to the target position;
setting a throttle command value according to a combination of the error distance and the approaching speed;
detecting a disturbance direction with respect to the ship; and
controlling a rudder and a propelling force generator of the ship to maintain a stern of the ship oriented toward the disturbance direction.

15. The recording medium of claim 14, the processing further comprising:
setting an inner segment and an outer segment of a target range of the fixed-point hold including the target position; and
differentiating the setting of the throttle command value based on whether the error distance is within the inner segment or the outer segment.

16. The recording medium of claim 14, the processing further comprising:
differentiating the setting of the throttle command value based on whether the approaching speed is a positive value or a negative value.

* * * * *